(12) United States Patent
Hagenbuch

(10) Patent No.: US 8,635,754 B2
(45) Date of Patent: Jan. 28, 2014

(54) METHOD OF REBUILDING OFF-HIGHWAY TRUCK BODIES

(71) Applicant: LeRoy G. Hagenbuch, Peoria Heights, IL (US)

(72) Inventor: LeRoy G. Hagenbuch, Peoria Heights, IL (US)

(*) Notice: Subject to any disclaimer, the term of this patent is extended or adjusted under 35 U.S.C. 154(b) by 0 days.

(21) Appl. No.: 13/853,382

(22) Filed: Mar. 29, 2013

(65) Prior Publication Data

US 2013/0255083 A1  Oct. 3, 2013

Related U.S. Application Data

(60) Provisional application No. 61/618,452, filed on Mar. 30, 2012.

(51) Int. Cl.
*B23P 19/04* (2006.01)

(52) U.S. Cl.
USPC .................................................. 29/402.08

(58) Field of Classification Search
USPC ............... 29/402.08, 402.01, 402.03, 402.1; 296/183.2; 298/17 T
See application file for complete search history.

(56) References Cited

U.S. PATENT DOCUMENTS

| 6,036,275 | A | * | 3/2000 | Hansen et al. | 298/17 T |
| 2012/0207581 | A1 | * | 8/2012 | Hagenbuch | 414/812 |
| 2013/0043701 | A1 | * | 2/2013 | Hagenbuch | 296/184.1 |

\* cited by examiner

*Primary Examiner* — John C Hong
(74) *Attorney, Agent, or Firm* — Leydig, Voit & Mayer, Ltd.

(57) ABSTRACT

A method of rebuilding an off-highway truck body by replacing the entire body floor with a replacement body floor specifically built for the intended application of the truck body. Custom-built replacement body floors are thus used to successfully rebuild the off-highway truck body to specific applications with minimum effort.

6 Claims, 27 Drawing Sheets

METHOD OF REBUILDING OFF-HIGHWAY TRUCK BODIES

TECHNICAL FIELD OF THE INVENTION

The present invention generally relates to off-highway trucks and the bodies on these off-highway trucks, and particularly to the rebuilding of such truck bodies. In particular, this invention relates specifically to large off-highway trucks which can carry/haul one hundred (100) to four hundred (400) ton payloads or more. In truck body volume, these payloads can translate to anywhere from as much as eighty (80) cubic yards to three hundred twenty (320) cubic yards and greater. As a comparison, a typical on-highway tandem axle dump truck body carries ten (10) cubic yards.

BACKGROUND OF THE INVENTION

Off-highway trucks and associated truck bodies are typically used in quarries, steel mills, power plants, mines, and landfills. Off-highway trucks with carrying capacities of four hundred (400) tons and greater are commonly used for hauling a variety of materials in various off-road hauling environments. As the generic name implies, "off-highway" vehicles/trucks are limited to private, off-highway road use and are typically used in mining or heavy-material haulage environments.

Typically, these off-highway vehicles operate on unpaved gravel or aggregate roads of varying quality. Moreover, with specific regard to mining operations, as these operations advance, new temporary roads are continually being constructed and old roads abandoned. Thus, such 'mine' roads can be undulating and at times have extremely soft/poor under footing, which can cause the off-highway trucks operating on these roads to twist or turn at times racking their very frames and the truck bodies sitting on these truck chassis.

The manufacturers of such off-highway trucks generally supply a generic-type, one basic style with minor variations fits all, truck body. While the manufacturer may offer some truck body options, such as body liner plates, floor body rear extensions, or body sidewall extensions, the truck bodies all typically have the same 'assembly line' body floor underpinnings. It is rare that this 'generic' body approach ever incorporates different body floor underpinnings or structural components that are dependent on the operating conditions that are specific to the location where the truck body is finally being employed or used.

On large off-highway trucks of this size (i.e., up to four hundred (400) ton payload capacity), it is the truck body floors and particularly the body floor substructures that can, over time, be damaged to the point of needing a complete and total repair or rebuild of the typical body floor.

A typical off-highway truck body consists of:
1, the truck body floor, which provides the "foundation" of the truck body;
2. the truck body sides;
3. the truck body front wall or slope; and, optionally,
4. the truck body tailgate, which provides a fourth side of the truck body.

In practice, of the four components of an off-highway truck body, it is the truck body floor—the "foundation" of the truck body—that is subjected over time to extreme loading impacts. While the truck body sidewalls and front wall are occasionally impacted, these impacts are typically of a material rolling nature against the sidewalls and front wall. In contrast, the truck body floor is continually being impacted by material dropping vertically onto it. Further, while there may be some damage to the sidewalk and front wall caused by loading equipment, any such damage is normally easily repaired. Truck body floors, however, are subjected to a continuous "drop balling" impact that is similar to when drop balls are used to destroy buildings and other large structures.

Typically, when an off-highway truck body reaches the point in its service life where it must be removed from service for a repair or rebuild as a result of this "drop balling," it is normally because the off-highway truck body floor, i.e., the "substructure" of the truck body "foundation," has reached the point of functional obsolesce and could shortly fail completely, if not extensively repaired or rebuilt.

Off-Highway Truck Owning & Operating Costs

For the owners of off-highway trucks to achieve their needed return on their investment in off-highway trucks, the loading of off-highway trucks with one hundred (100) to four hundred (400) ton or more payloads must be carried out efficiently and quickly. The typical cost of these off-highway trucks is between twelve thousand ($12,000.00) and sixteen thousand ($16,000.00) dollars per ton of carrying/hauling capacity, so a one hundred (100) ton hauling capacity off-highway truck will cost approximately $1,400,000 and a four hundred (400) ton capacity off-highway truck will cost approximately $5,600,000.

When one looks at the costs for off-highway trucks, the 'hourly' owning and operating cost of these vehicles is in the range, for a one hundred (100) ton capacity truck of about $120 per hour and for a four hundred (400) ton truck of about $380 per hour. These owning and operating costs make it imperative that for each and every hour of operation, the off-highway trucks must be moving and hauling as much material as possible. At around $2.00 to $6.30 per truck-operating minute, respectively, every minute that such trucks are not moving material costs. So quick and expedient loading of off-highway trucks is absolutely essential. Each minute added to a haul cycle over one ten hour shift can translate to two less loads being hauled.

A typical haul cycle for an off-highway truck includes (a) loading, (b) hauling the load to a dump point, (c) dumping the load, and (d) returning to the load point for the next load. Off-highway truck haul cycles can be anywhere from fifteen (15) minutes to over sixty (60) minutes, per cycle. A typical haul cycle is fifteen (15) to twenty-five (25) minutes. Assuming an average twenty (20) minute haul cycle, the off-highway truck loading must be quick and efficient. Every minute spent loading an off-highway truck results in a one (1) minute longer total vehicle haul cycle.

In typical off-highway truck high-production haulage operations the goal is to have a vehicle loaded in three (3) to four (4) minutes or less. Typical off-highway truck loading tools, whether they be large power shovels (either cable operated or hydraulically operated) or front end loaders, have a forty five (45) second to one (1) minute loading cycle. Thus, to fill a four hundred (400) ton nominal capacity off-highway truck in three (3) to four (4) minutes will require four (4) to a maximum of five (5) shovel passes. For a nominal four hundred (400) ton capacity truck this means that shovel or loader bucket capacities of eighty (80) to one hundred ten (110) tons per loading pass are dumped (i.e., drop balled) onto the off-highway truck body floor. Today, such bucket load capacities are achievable with loading shovels such as a P&H 4100 electric rope shovel or Caterpillar 7495 electric rope shovel.

Truck Body Floor Impacts Versus Body Floor Life

A nominal one hundred (100) ton capacity loading shovel that is loading a four hundred (400) ton capacity truck in a minimal amount of time, will result in extremely significant body floor loading 'impacts' as the one hundred (100) ton plus buckets of material are repeatedly dropped (drop balled) onto the truck body floor. These, loading impacts normally occur at or near the longitudinal center of the truck body floor. Further, since off-highway truck bodies are often open ended in order to facilitate the dumping of hauled material, the longitudinal area of a truck body floor that is severely load impacted repeatedly starts a short distance from the truck body front wall and progresses rearward to a point slightly behind the off-highway truck chassis dump body pivot or hinge connection. It is this region, at the center of the truck body floor, that is regularly load 'impacted'. Accordingly, in off-highway truck bodies, this floor center is where degradation of the body floor structure initially occurs and begins spreading out to other areas of the body floor.

Off-Highway Truck Chassis to Truck Body Floor Interface—Effect

The floors of high capacity off-highway truck bodies range in width from a nominal twenty (20) feet, up to and in excess of thirty (30) feet wide. With truck body floor structures of this width, body floor damage often begins at the body floor anchor point or truck chassis pivot.

Truck body floors typically interface with an off-highway truck chassis at a minimum of at least four different points. However, the floors are only anchored at one point. The different body interface locations include:
1. The truck body floor to off-highway truck chassis pivot or hinge point, which is the one truck body floor anchor point.
2. The truck body floor 'frame rails', which only sit on the off-highway truck chassis. (This interface point typically includes rubber frame pads between the bottom of the truck body frame rails and the off-highway truck chassis to accommodate any irregularities.)
3. The connection between the off-highway truck chassis hydraulic hoist or body dump cylinders to the truck body floor. These hydraulic dump cylinders are normally in a "float mode" when they are not dumping the off-highway truck body.
4. Optionally, in some off-highway truck body mounting configurations, the truck body may sit on some support saddles near the front of the truck body via an off-highway truck chassis body guide or stabilizer, that is interfaced with the front of the truck body front wall and/or floor.

Of these four (4) interface points between the truck body and off-highway truck chassis, only the body pivot interface is able to constrain and retain the truck body on the off-highway truck chassis. As such, tremendous dynamic loads in the truck body to chassis pivot area occur in maintaining body stability on the off-highway truck chassis, keeping the truck body from falling off of the off-highway truck chassis.

In addition to the loading impacts, dynamic body floor stresses also occur in normal off-highway truck operation because the off-highway truck transverses undulating and curved off-highway truck haul roads. These dynamic forces are further exacerbated by a common off-highway truck body loading condition, where the load is maybe off center side to side of the body. In fact, it is rare that in the loading of an off-highway truck body, that all loads are perfectly centered on the off-highway truck body chassis.

Further, on a typical two hundred forty (240) ton capacity off-highway truck with a truck body floor width approaching twenty five (25) feet, the actual truck body pivots are only slightly more than five (5' 3") feet, apart. Moreover, on a four hundred (400) ton capacity off-highway truck with a truck body floor width of roughly thirty (30) feet, the truck body pivots are only about seven and one half (7' 7") feet, apart.

Comparing off-highway truck body floor width with the width of the truck body to truck chassis anchor point, it is relatively easy to see that significant cantilever stresses occur at the truck chassis to truck body anchor or pivot points. These truck body anchor point stresses are radiated out into the truck body's structural members themselves, and these anchor point cantilever stresses are further amplified by any off center truck body load placement, which all lead to the degradation of the truck body floor substructure or floor "foundation".

In fact, on a two hundred forty (240) ton capacity off-highway truck there is about ten (10) feet of body floor on either side of the off-highway truck chassis body anchor or pivot points. On a four hundred (400) ton capacity off-highway truck there is more than eleven (11) feet of body floor that is cantilevered to either side of the off-highway truck chassis body anchor or pivot points.

Furthermore, in dumping an off-highway truck body, the hydraulic dump cylinders are anchored to the truck body floor at a position slightly ahead of the truck body to off-highway truck chassis pivot, thus another point of high body floor stresses and a potential truck body floor failure location.

Truck Body Floor Application Versus Truck Body Floor Life

Truck body floor life is predicated by the actual materials being loaded into and hauled by the off-highway truck body. Generic truck body floors are normally designed to accommodate most normal materials and conditions.

The haulage of materials is further affected by the climatic conditions in which these materials are being hauled. For example, whether the haulage temperatures are moderate throughout the year or whether extremely freezing conditions (minus 40 C) are prevalent during some portions of the year play a role in the truck body life. For example, material that might otherwise break easily on impact with a truck body floor could when frozen have an entirely different effect on a truck body floor.

Some typical types of hauled materials and the corresponding haulage conditions include:
1. Material such as plain alluvial dirt which rarely freezes into solid chunks (more temperate climates) will cause relatively mild truck body floor impact.
2. Material that has low tensile strength, such as coal that easily breaks up on impact, causes only mild truck body floor impact.
3. Material that does break up relatively easy; but, contains little abrasive materials will be fairly easy on a truck body floor.
4. Material that will break up when thrown against itself is only marginally harder on a truck body floor.
5. Material that has high tensile strength and only breaks up in a mechanical crusher can shorten a truck body floor life considerably more.
6. Material that does not easily break up other than when mechanically crushed and that has highly abrasive qualities (such as having silica content) can impact the truck body floor in an extreme manner.

Truck Body Floor Life Versus Off-Highway Truck Life

Today, in the off-highway truck operating arena, a common mantra is that if a truck body floor lives the truck body lives.

In contrast, once an operator has to start working on and repairing a truck body floor, then that truck body floor and associated truck body components (body sides, body front wall, and body canopy) are close to the end of their useful life. Due to the high stresses that can and do occur in the area of the truck body to chassis pivot connection, when combined with the truck body floor impacts, it is in the area of the truck body to chassis interfaces, i.e., the truck body pivots, the truck body frame rails, and the truck body hoist mounts, that off-highway truck body floor substructure failure begins.

Off-highway truck body floors in most operating environments will at some point fail. Considering the rigors which off-highway truck bodies are subjected to, the failure in many operating environments of truck body floors should come as no surprise. Moreover, with the costs of off-highway trucks factored into the equation, it is essential to keep these vehicles up and operating. As a result, many operators have spare truck bodies in their replacement truck body inventory. These truck bodies are rarely new bodies, but rather are bodies from an off-highway truck chassis that may have reached the end of its useful life. Off-highway truck chassis typically have useful lives of one hundred thousand (100,000) hours to one hundred fifty thousand (150,000) hours of operation. (A typical operating hour year is about seventy five thousand (7,500) hours.) In some mining environments typical off-highway truck bodies may require major rebuilds in as little as fifteen thousand (15,000) hours to as much as thirty to forty thousand (30,000 to 40,000) body operating hours. Either way, sometime during the life of the off-highway truck, a major truck body floor rebuild will be required.

The costs and times to rebuild a truck body taken out of service for rebuilding vary widely,
1. The costs to completely rebuild an off-highway truck body can often run as much as half the cost of a new truck body. In one environment if the costs to rebuild are estimated to exceed two hundred fifty thousand (250,000) dollars then the off-highway truck body is typically scrapped. Costs for a total body rebuild (which typically translates to a complete body floor rebuild) can vary from as little as fifty thousand (50,000) dollars to a quarter of a million (250,000) dollars.
2. Clearly with these estimated sums of money, complete body rebuilding times can vary from three (3) to as much as nine (9) weeks. In fact many mines have dedicated body rebuild crews who are continuously busy rotating the mine's off-highway truck bodies thru a complete body rebuild. As soon as they finish one off-highway truck body they start on another.
3. And finally, try as they may, when an off-highway truck body rebuild crew starts reworking cracked and twisted pieces of steel, the rebuilt body can never be of the quality that it was originally. For every obvious component of an off-highway truck body that needs replacement, there may be one or two other components which may be near failure though no visual evidence of this is indicated.
4. When off-highway truck bodies reach the point of needing rebuilding it is easy to pick out the obvious items that have failed and must be rebuilt, when in fact the entire body floor may be compromised to some degree. Thus, while it is possible to rebuild an off-highway truck body, the additional life one can expect from just rebuilding existing truck bodies is about one half of the life that the off-highway truck body experienced before requiring a rebuild.

Considering all of the above, then a method which would allow for cost effective and quick rebuilding of an off-highway truck body for returning the truck body quickly to service would allow equipment operators to cost effectively and quickly rebuild off-highway truck bodies while keeping their inventory of spare replacement bodies to a minimum.

SUMMARY OF THE INVENTION

A method for rebuilding off-highway truck bodies includes replacing the entire floor of a truck body being rebuilt with a new application-specific truck body floor.

This process involves analyzing the application that the rebuilt truck body will be used in and then creating a truck body floor design that emulates a body floor of sufficient durability and design to address the intended use of the rebuilt truck body. The design of this new body floor can incorporate several improved features that can be incorporated in the truck body floor design. The end result of this body rebuilding process will be a truck body that is superior in characteristics to the original truck body as it was put into service. It is possible that, because the new truck body floor is truly designed for its intended use, the result can be a truck body with an even greater durability than the original body.

Fabrication of the replacement truck body floor begins at a manufacturing site that can be remote from the working site. Depending on the width of the new floor, it may be completely fabricated at the manufacturing site and then shipped to the working site for attaching to the existing body sidewalls and body front wall assembly. If the overall width of the new floor is too great for shipment as one piece, it can be partially fabricated at the manufacturing site and shipped in pieces to near the working site where its fabrication is completed before being attached to the existing body sidewalls and body front wall assembly.

DETAILED DESCRIPTION OF PREFERRED EMBODIMENTS

Figure 1:
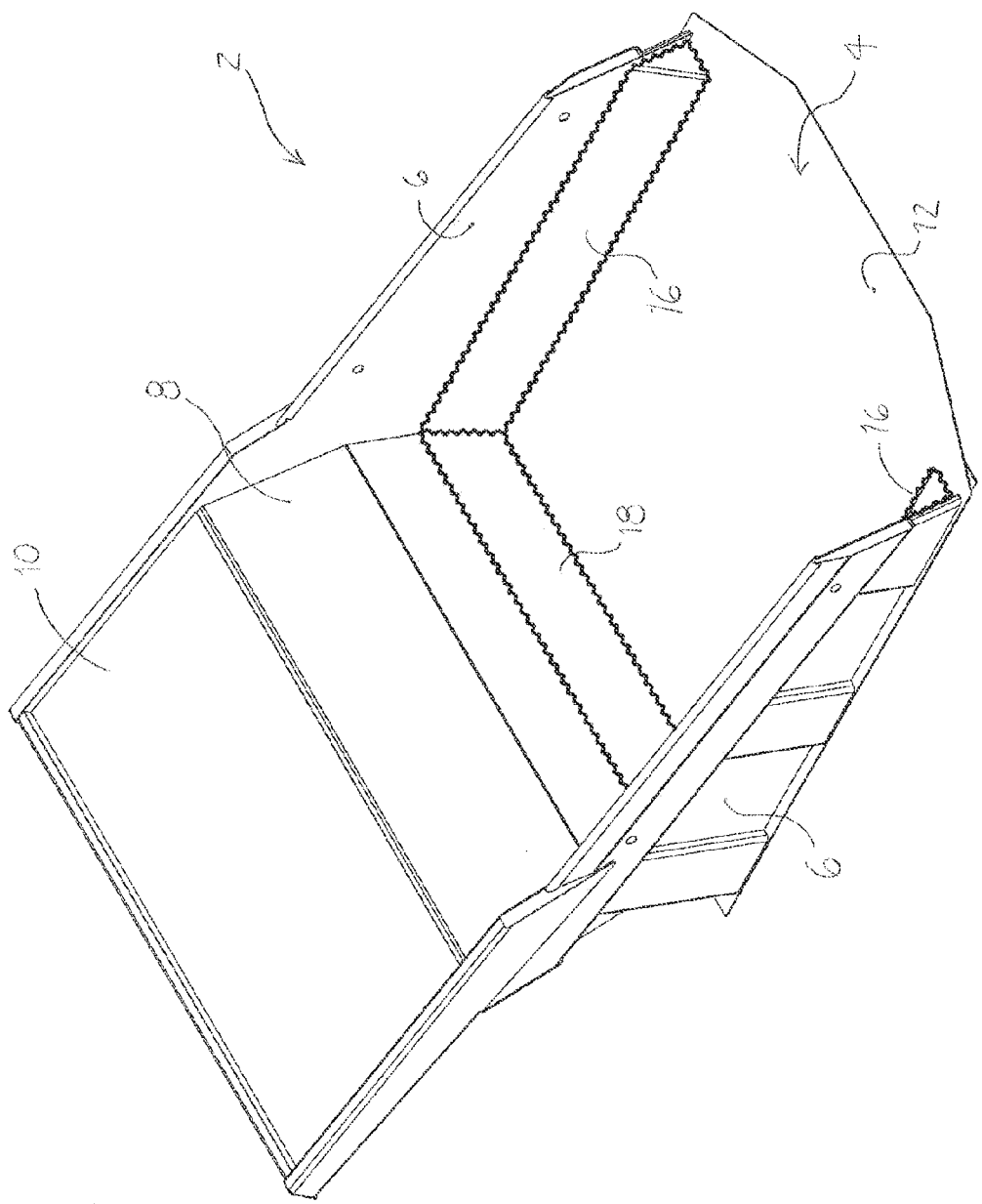
FIG. 1 is an isometric top view of a truck body with a floor component that has reached structural obsolescence, with contact edges of the gussets emphasized.

FIG. 1 is an isometric top view of a truck body 2 with a floor component 4 that has reached structural obsolescence. The truck body 2 is an off-highway truck body with a 100 ton or greater payload hauling capacity, and along with the floor includes two side walls 6 and a front wall 8. A canopy 10 extends forward from the top of the front wall 8 in order to cover the front of a corresponding truck chassis, and particularly the operator's cab of the off-highway truck. Due to the stresses of operating the truck body, in particular the dropping of loads onto the truck body floor 4, portions of the floor 4 have been damaged and structurally failed or are near failure. As a result of the damage the truck body floor is structurally worn out and functionally obsolete. The sections of the truck body floor 4 that have been damaged may include the floor plate 12 that is visible in FIG. 1, or it may include parts of the truck body floor frame 14, which is shown on a replacement floor in FIGS. 5-16. In additional to clear damage that is easily identified, the floors may contain cracks in the body subfloor components that are visible only upon close inspection. Unlike conventional methods, where the particular components of the truck body 2 are evaluated for damage and only those with major areas of wear and damage are individually replaced, in accordance with the invention, the rebuild of the truck body 2 includes a replacement of the entire truck body floor 4 as described in further detail in the following.

In addition to the components listed above, the truck body 2 also includes gussets 16, 18 along the edge where the floor 4 meets the walls 6, 8. In particular, the truck body 2 includes two side gussets 16 that extend between the respective side walls 6 and the floor 4 and a front gusset 18 that extends between the front wall 8 and the truck body floor 4. As part of the rebuilding process these gussets are removed. The jagged line shown in FIG. 1 around the top and bottom of the gussets shows where the gussets 16, 18 are detached or cut away from the floor 4 and respective walls 6, 8.

Figure 2:
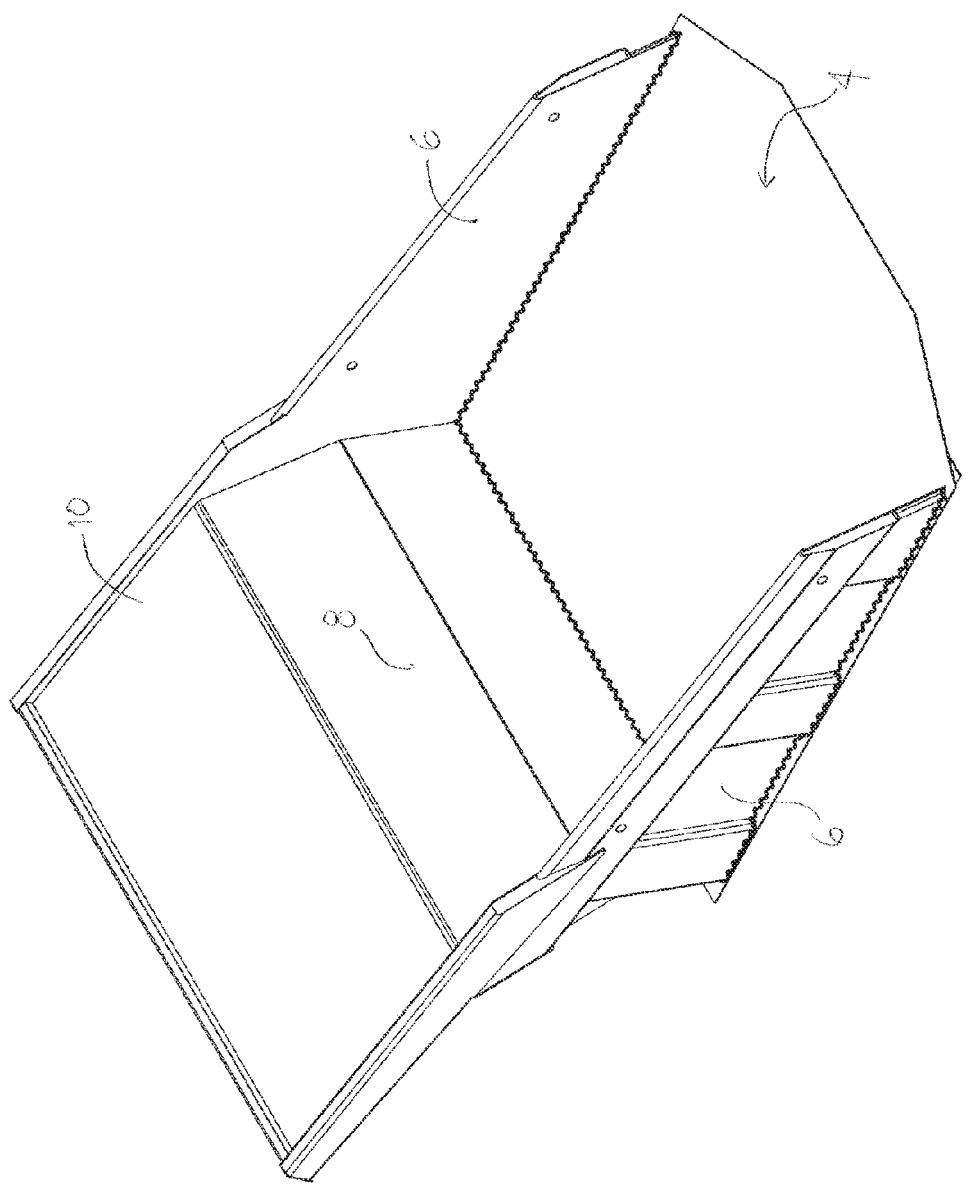
FIG. 2 is an isometric top view of the truck body of FIG. 1 with the body floor to body side gussets and body floor to body front wall gusset removed.

FIG. 2 is the isometric top view of the truck body 2 of FIG. 1 with the front and side gussets 16, 18 cut away and removed. This truck body is now ready to have the body sidewalls 6 and the body front wall 8 cut away from the functionally obsolete old body floor 4. The jagged line between the body sidewalls 6, the body front wall 8 and the body floor 4 indicates where the obsolete floor will be detached or cut away from the sidewalk and the front wall. To fully remove the original floor from the body front wall and body side walls, each of the walls is detached from the body floor along an existing seam that connects these respective components.

Figure 3:
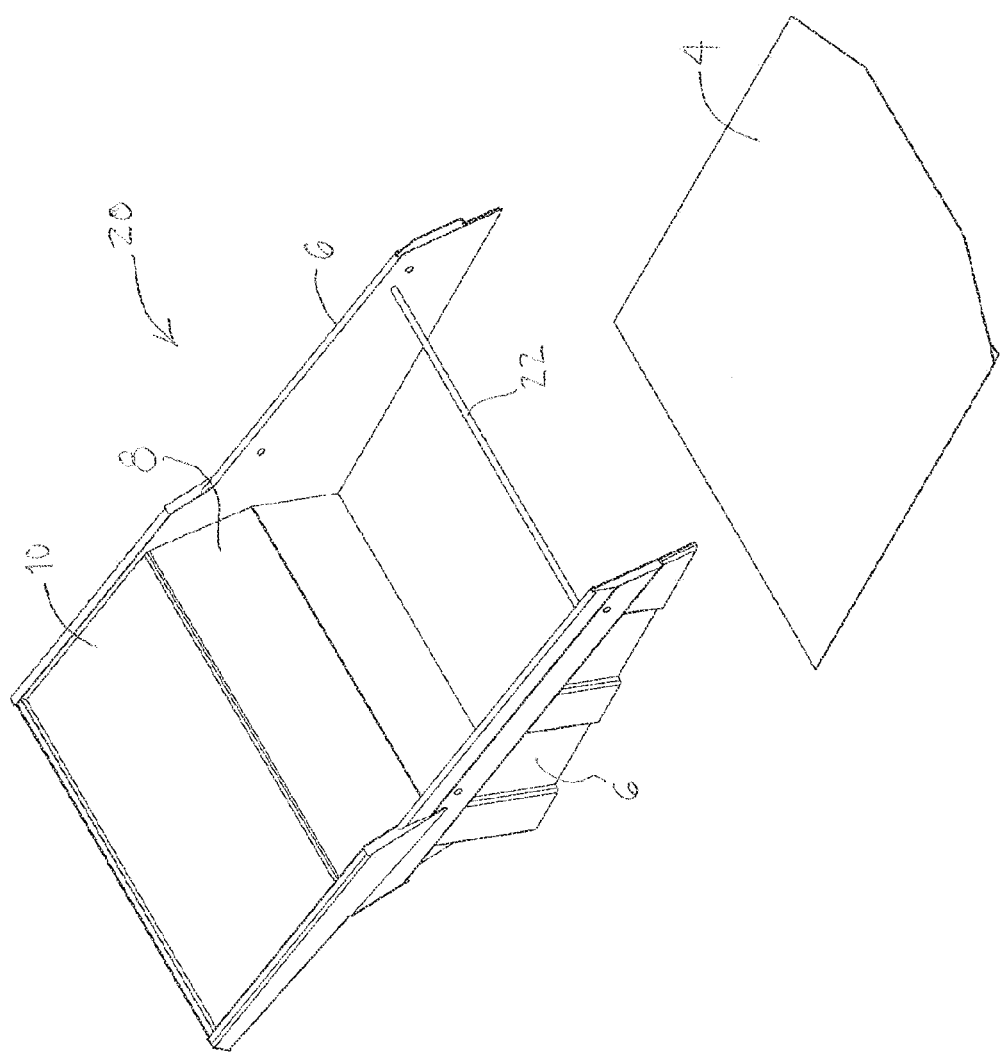
FIG. 3 is an isometric view of the truck body of FIG. 1 with the body sidewall-body front wall assembly separated from the original floor and a stabilizer installed between the sidewalk.

FIG. 3 illustrates the components of the body after the body sidewalk 6 and body front wall 8 have been removed from the original body floor 4. Preferably, the body sidewalk and body front wall are maintained in a connected wall assembly 20 when they are removed from the floor 4. In the illustrated embodiment, the canopy 10 is also kept as part of the assembly 20. In order to maintain stability between the several components of the wall assembly 20, particularly the free rear ends of the body sidewalk 6, a stabilizer member 22 has been added between the body sidewalk 6 to facilitate moving the body sidewall and body front wall assembly.

Figure 4:
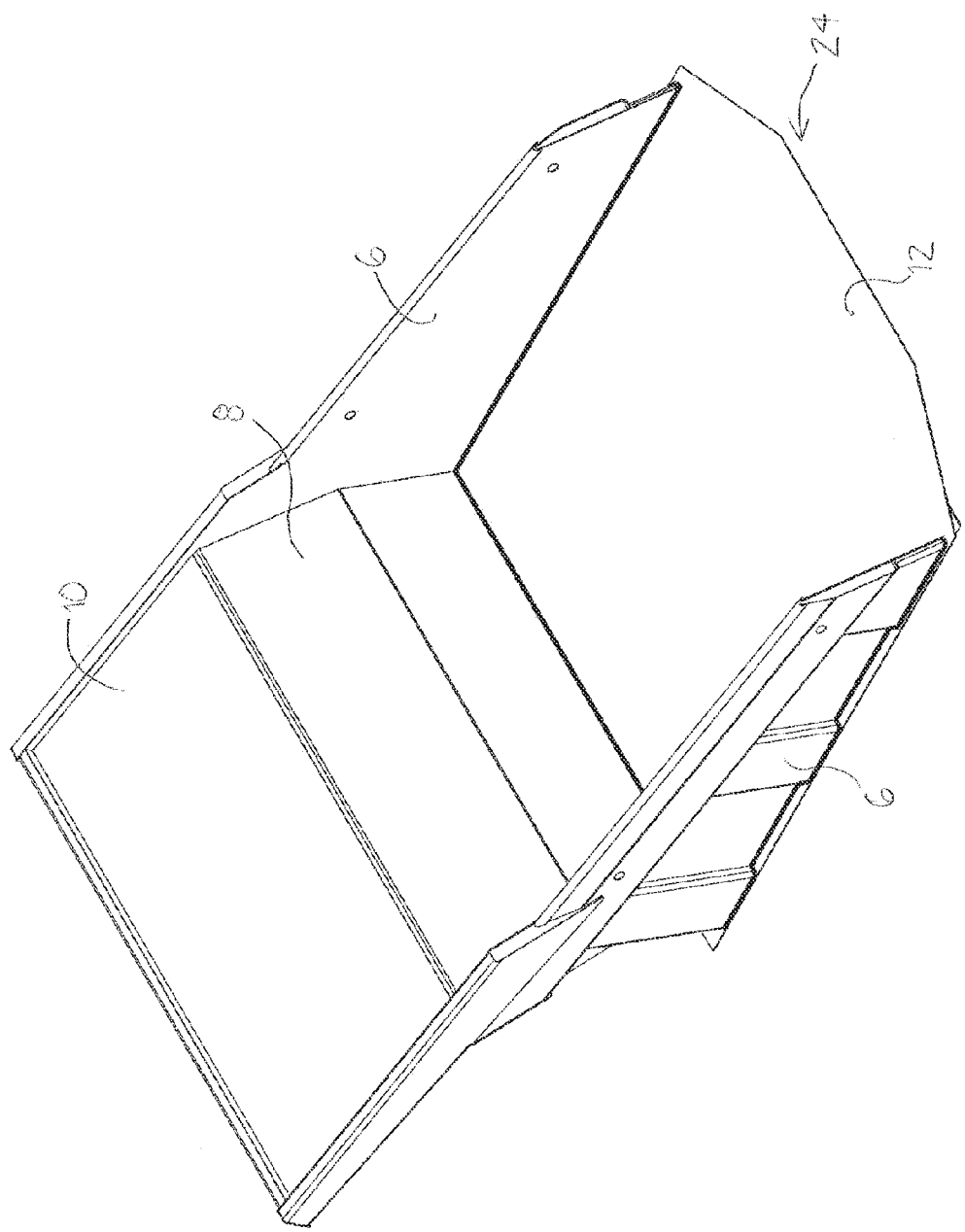
FIG. 4 is an isometric view of the body of FIG. 1 with the original body sidewall-body front wall assembly and a new truck body floor.

FIG. 4 is again an isometric view of the body of FIG. 1 with the wall assembly formed by the original body sidewalks and body front wall placed on a new replacement truck body floor 24. In the illustrated embodiment, the new body floor 24 is dimensionally the same as the old functionally obsolete body floor 4 it is replacing. The body sidewall and front wall assembly 20 is now ready for attachment to this new replacement truck body floor and these two body components, i.e., the new body floor and existing body sidewall and body front wall are then attached together at the joint defined. In a preferred embodiment of the invention, the new truck body floor 24 is produced entirely with new parts. In other words, none of the parts from the original body floor 4 are reused in the construction of the new body floor 24.

In addition to having an entire assembly of new parts, the new truck body floor 24 is enhanced with additional new features, such that the configuration of the new body floor 24 differs substantively from the configuration of the original body floor 4. Advantageously, these new enhanced features can be selected based on the particular application in which the rebuilt truck body will be used. The determination of which new enhanced features should be included in the new floor 24 can be made based on the field conditions where the rebuilt truck body is used or alternatively can be made based on the structural damage that was done to the original truck body floor 4. In particular, the features can be selected based on the material that will be hauled and/or the environmental climatic conditions, in which the off highway truck will be operated. In addition, the enhanced features can be selected based on the "specific components" of the original truck body floor 4 that had the most severe damage.

Figure 5:
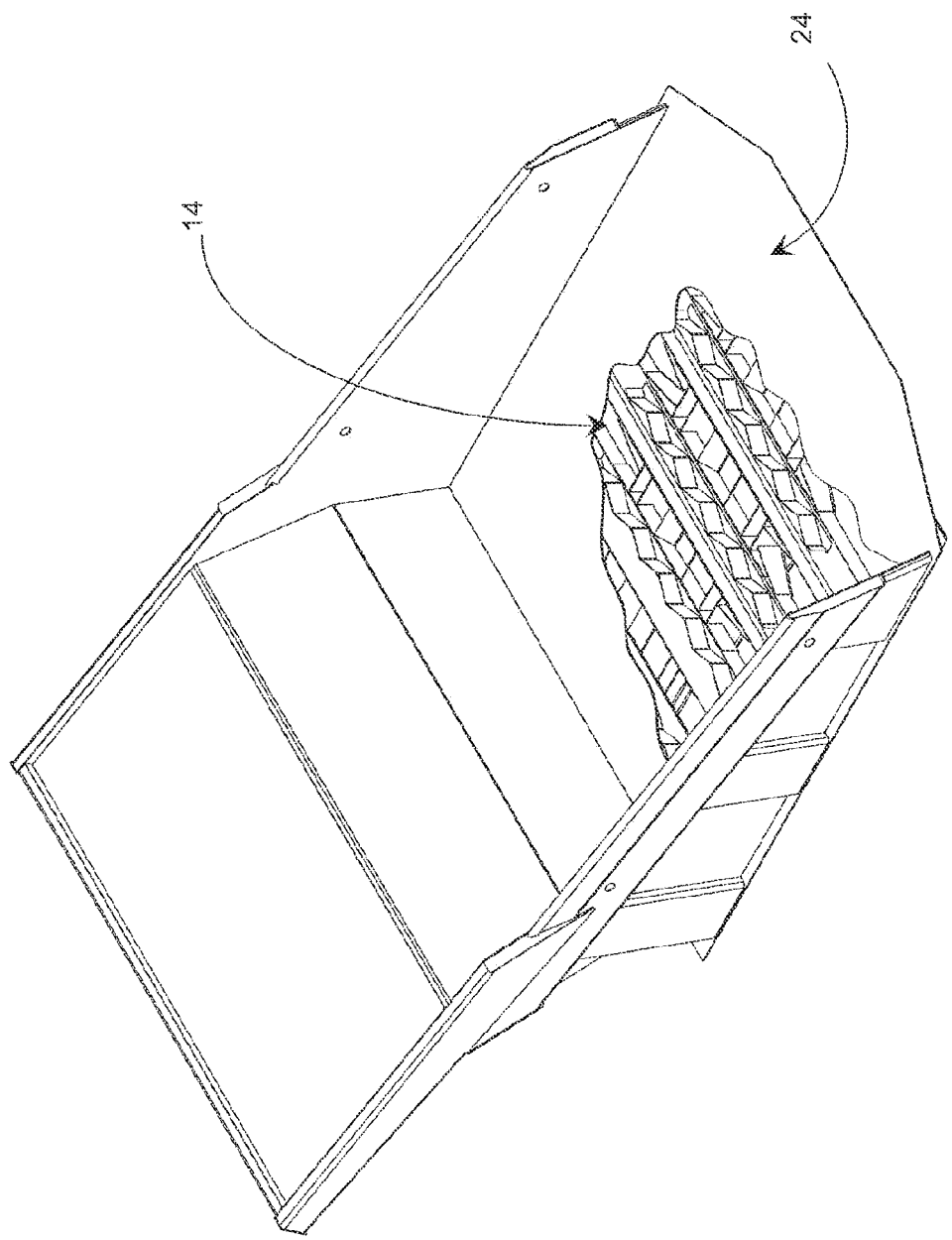
FIG. 5 is an isometric view of a rebuilt truck body with a portion of a new floor.
Figure 6:
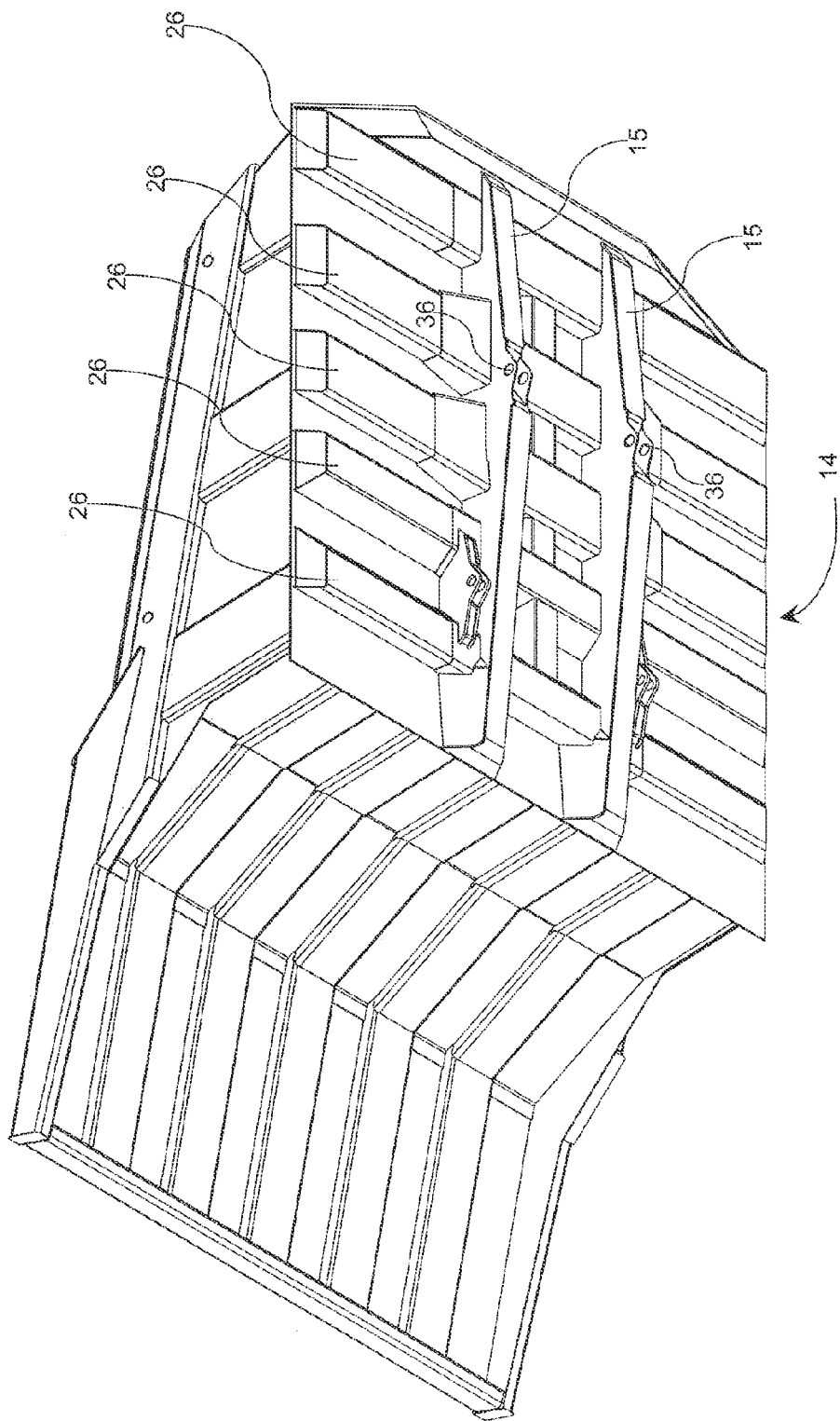
FIG. 6 is a bottom isometric view of the truck body of FIG. 5 illustrating various new truck body features.

Referring to FIG. 5, many of the additional enhanced features that may be added to the new truck body floor 24 are included in truck body frame 14, which is partially visible through a cutout in FIG. 5 and shown from beneath in FIG. 6. The truck body floor frame 14 includes two frame rails 15 running along the length of the truck body floor 24, where the length extends from the front wall 8 and canopy 110 to a rear edge of the truck body floor 24. The frame rails 115 are positioned toward the center of the truck body floor 24, with respect to the truck body width and run substantially parallel to each other. The truck body floor frame 14 also includes a series of bolster structures 26 extending across the width of the new truck body floor 24, where the width extends from one side wall 6 of the truck body floor 24 to the other. Together, the frame rails 15 and bolster structures 26 provide support for the new floor plate 12. In the illustrated embodiment, the new floor plate 12 is supported directly by both the bolster structures 26 and the frame rails 15. The bolster structures 26 are held within appropriately sized openings within the frame rails 15, so that a strong connection between these elements is formed, and so that the top of the bolster structures 26 and frame rails 15 can both be flush with and support the new floor plate 12. The two substantially parallel frame rails 15 also include pivot 36, where the new truck body floor 24 is connected to the off-highway truck chassis. The pivot 36 acts as a hinge point for the truck body when the truck body is pivoted to dump the loads held inside the truck body.

Figure 7A:
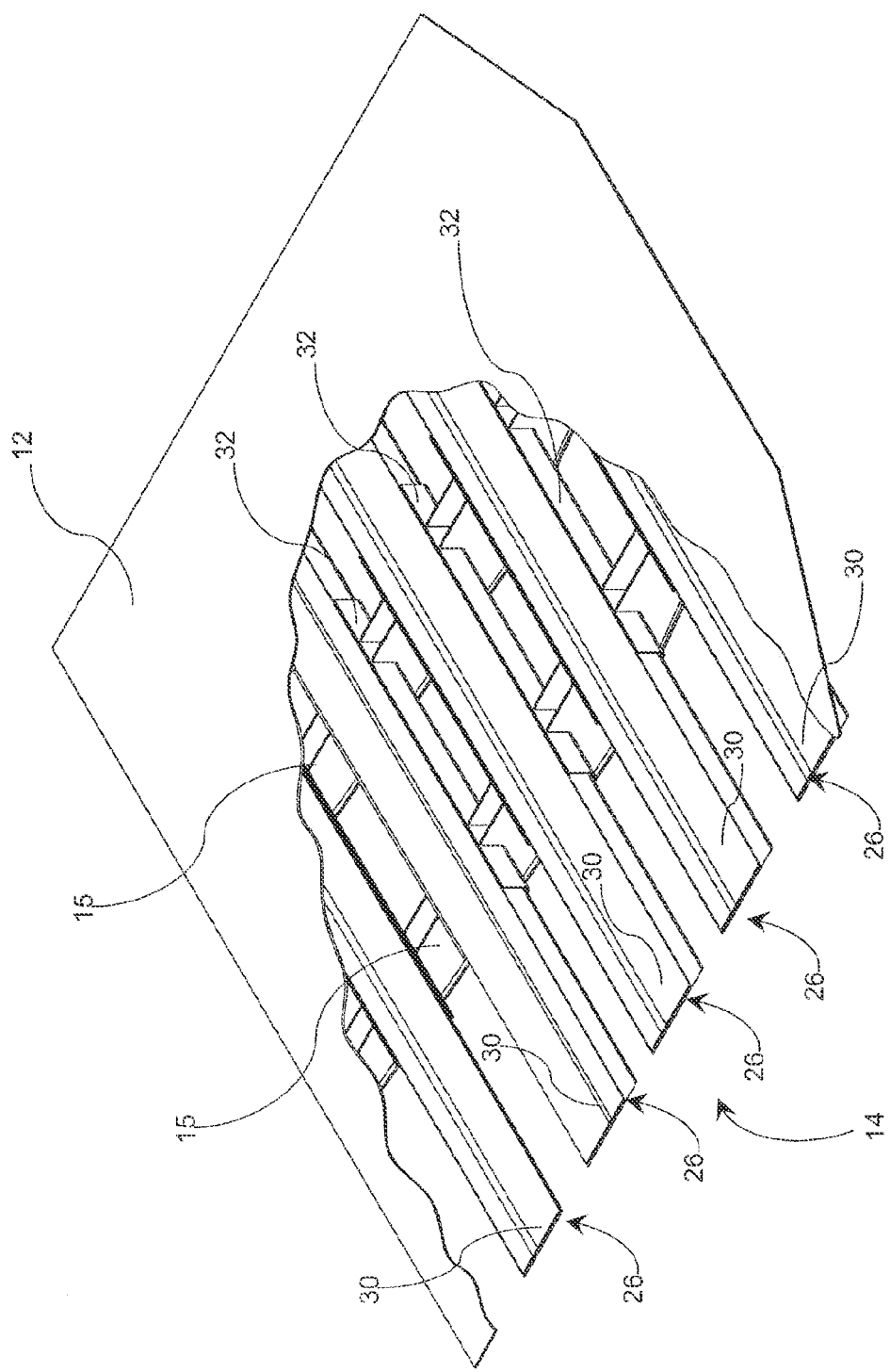
FIG. 7*a* is a top isometric view of a portion of the new truck body floor of FIG. 5 including a new floor bolster arrangement.
Figure 7B:
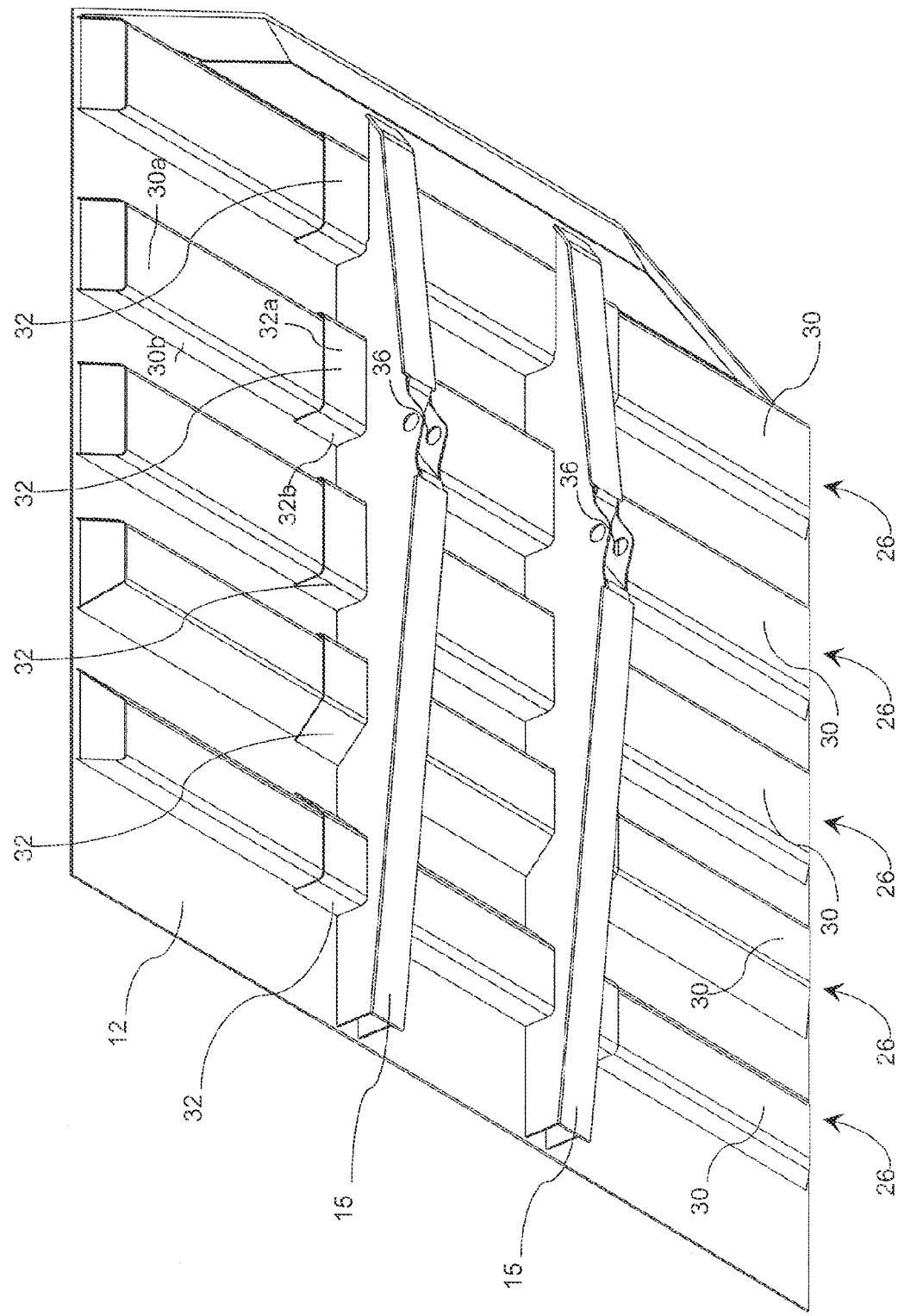
FIG. 7*b* is a bottom isometric view of the new truck body floor of FIG. 7*a;*
Figure 7C:
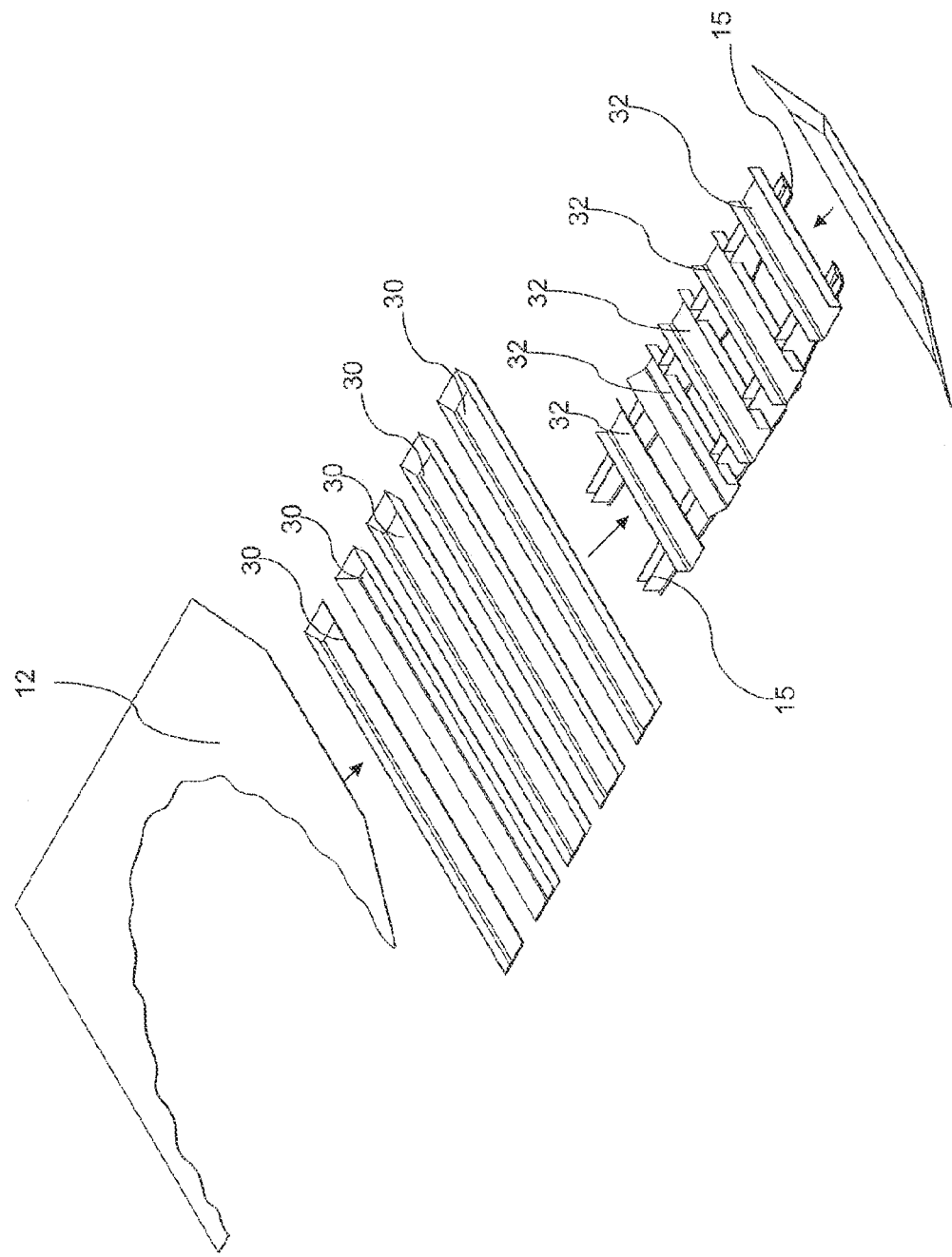
FIG. 7*c* is an exploded view of the new truck body floor of FIG. 7*a* illustrating the new floor bolster arrangement.

FIGS. 7A and 7B show an additional feature that can be added to the new body floor 24. This additional feature includes bolster structures 26 that have a layered or doubler construction including an inner bolster 30 and an outer bolster 32, which are coupled to one another with respective faces of the inner bolster 30 being flush against opposing faces of the outer bolster 32. Specifically, in the illustrated embodiment, the inner bolsters 30 are formed as a channel that is layered within the outer bolster 32, which is formed as a similar but larger channel and interlocked with the smaller channel. Thus, as shown in FIG. 7B, the inner bolster 30 includes a web 30a and opposing flanges 30b that are placed flush against a corresponding web 32a and flanges 32b of a respective outer bolster 32. Thus, the outer bolster 32 forms a layer of the bolster structure 26 over a portion of the inner bolster 30. In an embodiment, the inner and outer bolsters 30, 32 are welded together, although other forms of connecting the corresponding faces of the bolsters are also possible. By using both inner 30 and outer bolsters 32, the layered or doubler bolster is effectively doubled wherever both bolsters 30, 32 are present. Preferably, the outer holsters 32 are shorter in length than the inner bolsters 30 and disposed at the center of the length of the inner bolsters 30, as shown in FIGS. 7A-7C. As a result, the bolster structure 26 has a thickness that is greater at the center of the new truck body floor 24 than at the sides of the new truck body floor 24. This concentrates the layered doubler portion of the bolster structures 26 in the center of the new truck body floor 24, around the connection points with the off-highway truck chassis, where loading and associated stresses are concentrated. The bolster structures 26, which include inner 30 and outer bolsters 32, are able to compensate for the extreme cantilevered side floor loads that a truck body floor is exposed to because of the doubling of the layered center bolster structural support provided immediately under the center of a new truck body floor 24.

While the illustrated embodiment shows each of the bolster structures 26 as including the layered bolster configuration, with both an inner bolster 30 and an outer bolster 32, it is also possible for some of the bolster structures 26, along the length from front to back of the new truck body floor 24, to be formed by a single bolster component. For example, if only some of the bolster structures 26 included the layered doubler bolster structure, these doubled bolster structures could be concentrated near the pivot 36 of the truck body disposed on the body frame rails 15. In a specific example, the truck body floor frame 14 may only include the doubled bolster structures, each including an inner bolster 30 and outer bolster 32, on either side of the pivot 36. The load capacity of the bolster structures 26 could likewise be concentrated in certain locations by varying the length of the outer bolster 32. For example, the outer bolsters 32 could be longer near the pivot 36, or could increase in length from the front of the truck body floor toward the rear. For stronger support of loads in the truck body, it is preferable that the length of the outer bolsters 32 be longer than the distance between the two frame rails 15, so that each outer bolster 32 can be supported by both frame rails 15. On the other hand, it is typically not necessary that the outer bolsters 32 extend far toward the side walls 6 of the truck body. For example, the outer bolsters 32 may in some cases be less than half of the width of the new truck body floor 24 and accordingly, also in some cases be less than half the width of the inner bolsters 30.

In the embodiment shown in FIGS. 7A-C, the bolster structures 26 include the outer bolster 32 at the center of structure 26 and the inner bolster 30 extending along the entire length of the bolster structure so as to correspond to the entire width of the truck body. While truck body floors having bolster structures 26 with this construction are perfectly adequate functionally, their use can be limited due to shipping constraints. If the new truck body floor width is large, the shipping of the truck body floor, in a single piece may be difficult or even against regulations. Thus, the embodiment shown in FIGS. 7A-7C, including bolster structures 26 with members 30 extending across the entire width of the truck body 2, may be most appropriate where the width of the truck body is less than a certain size, or where the rebuilt truck body will be assembled nearby or on site.

Figure 8:
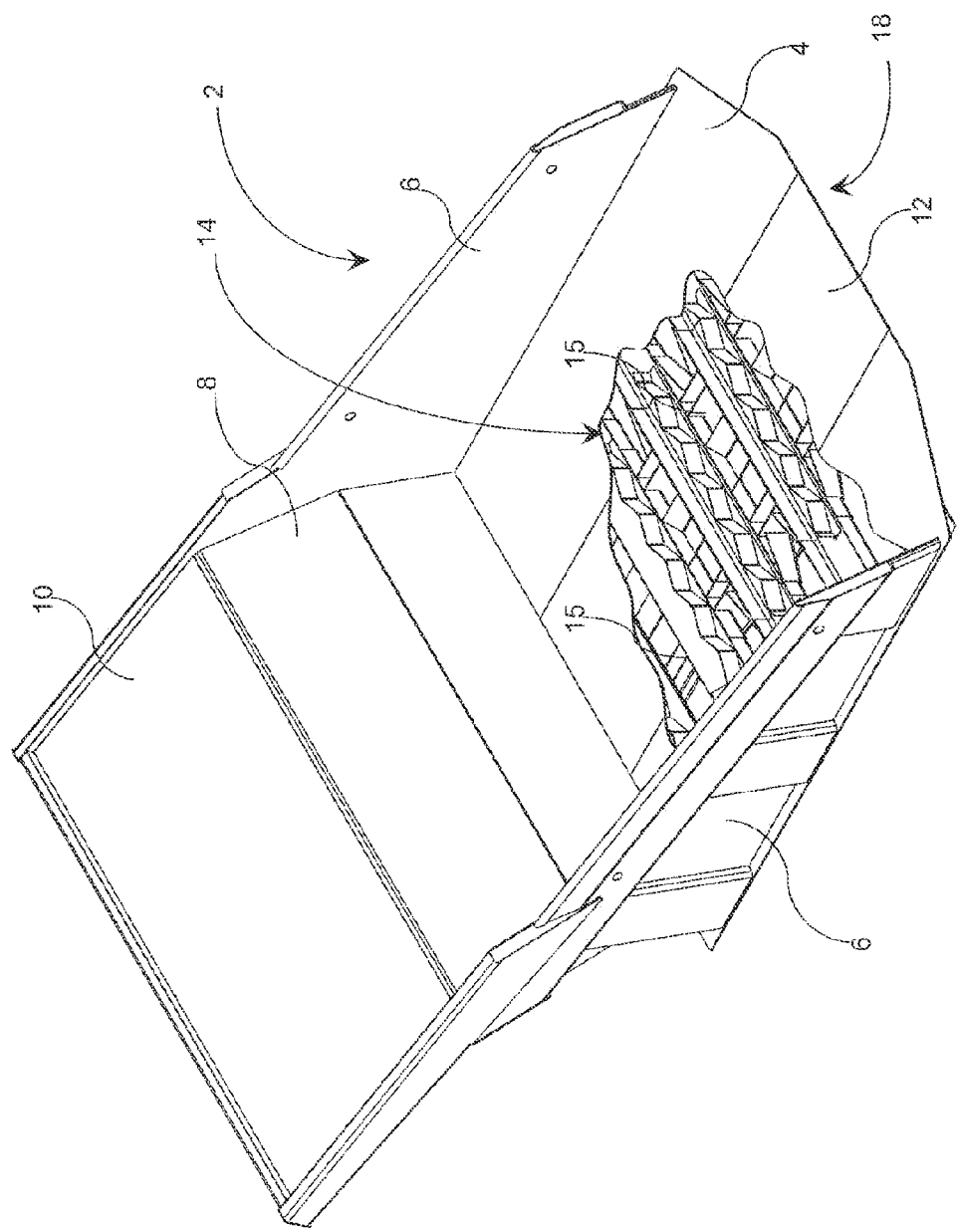
FIG. 8 is a top isometric view of an embodiment of a truck body with a new multi-piece floor construction for modular shipping.
Figure 9:
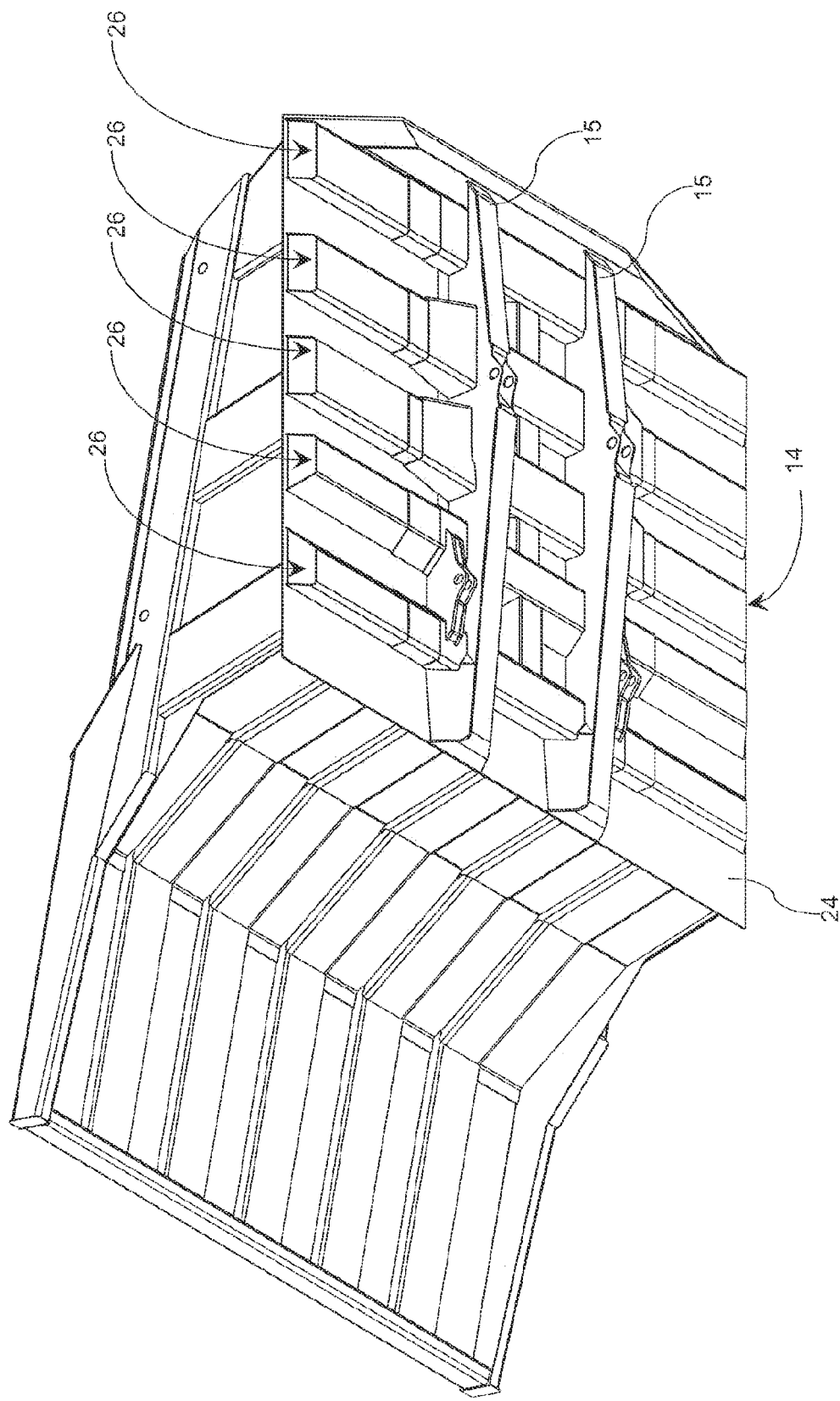
FIG. 9 is a bottom isometric view of the truck body of FIG. 8.
Figure 10A:
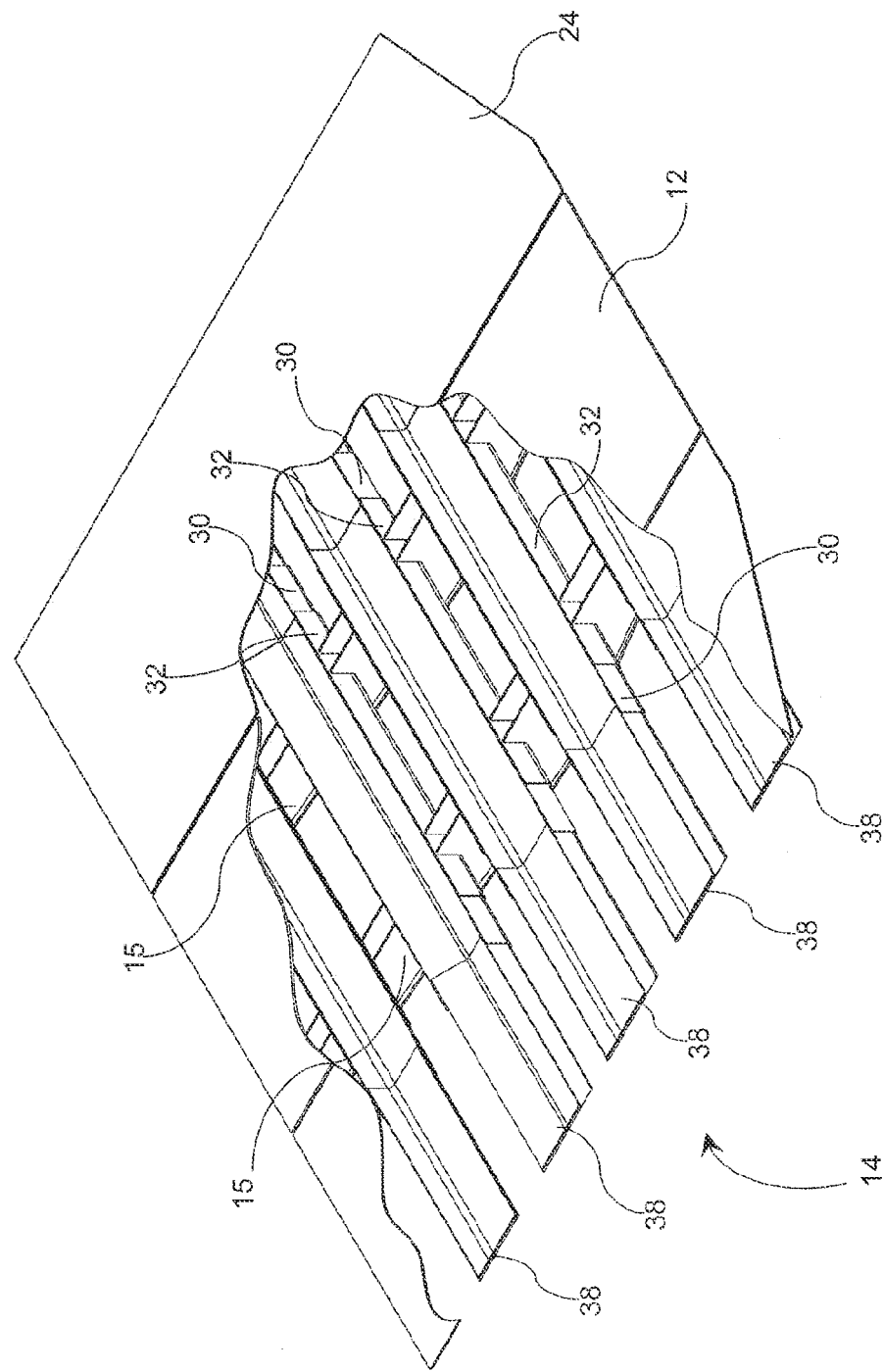
FIG. 10A is an isometric view of the new truck body floor shown in FIG. 8.
Figure 10B:
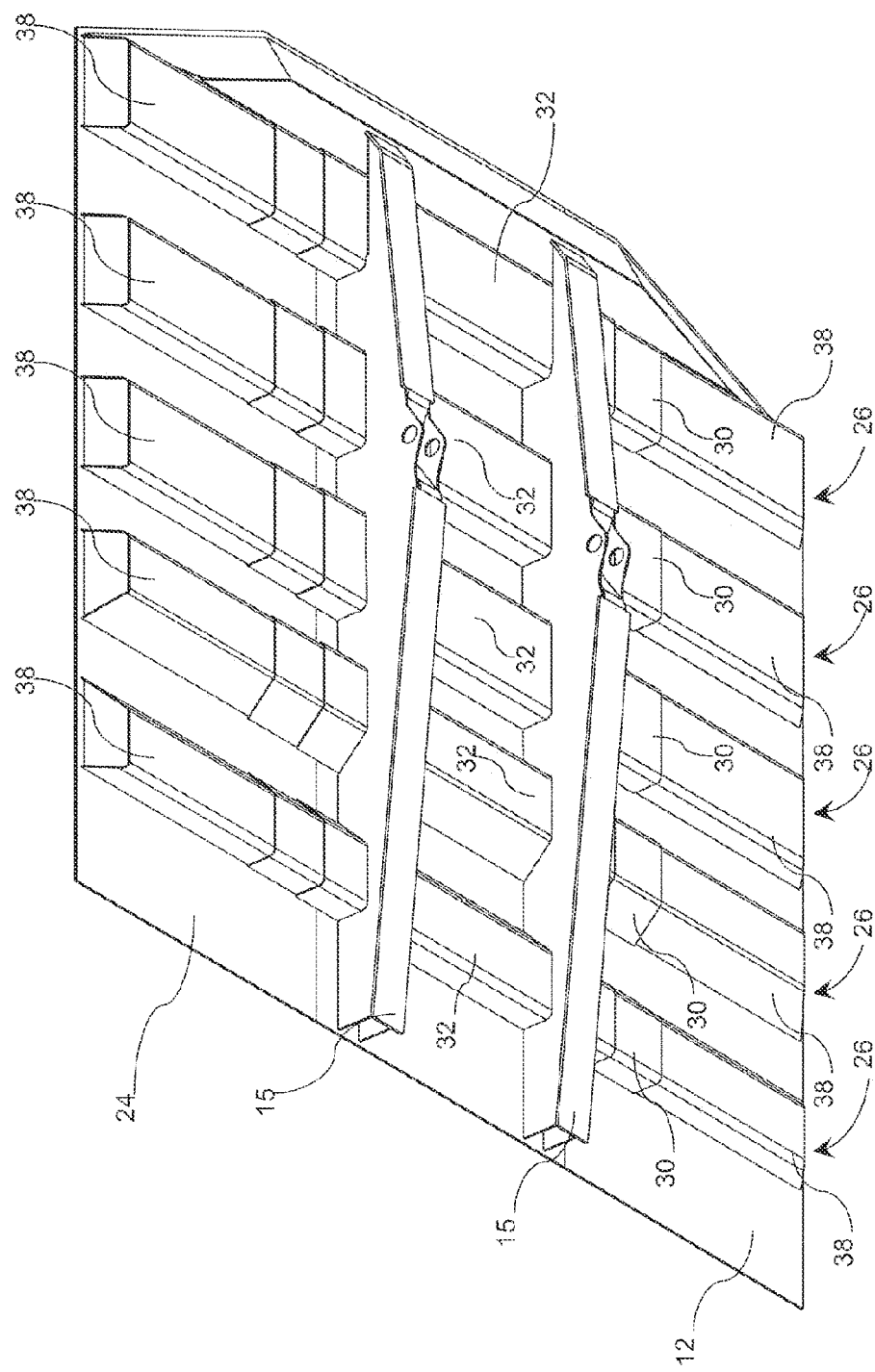
FIG. 10B is a bottom isometric view of the truck body floor of FIG. 8.

In instances where a large new truck body floor 24 is required, it may be advantageous to use an embodiment of the new truck body floor shown in FIGS. 8 and 9. Similar to the embodiment shown in FIGS. 5 and 6, the truck body of FIGS. 8 and 9 includes a new body floor 24, two existing side walls 6, an existing front wall 8 and an existing canopy 10. Likewise, the new body floor 24, shown alone in FIGS. 10A and 10B, includes a frame 14 with a pair of body frame rails 15 and a plurality of bolster structures 26 extending along a length of the body frame rails. Further, the bolster structures are doubled toward the center of the width of the new truck body floor 24, with an inner bolster 30 and an outer bolster 32. However, in contrast to the embodiment shown in FIGS. 5-7, the inner bolsters 30 of the truck body floor of FIGS. 10A and 10B do not extend across the entire width of the truck body. Instead, the ends of the bolster structures 26 as shown in FIG. 10B, at the outer sides of the truck body width, are formed by outside interlocking bolsters 38. Thus, each of the bolster structures 26 include an outside interlocking bolster 38 disposed at each end to support the loads toward the outer sides of the truck body. In the illustrated embodiment, these outside interlocking bolsters 38, are formed as channels, similar to the inner and outer bolsters 30, 32. Thus the outside interlocking bolsters 38 can fit inside or outside (inside shown) of the inner bolsters 30 for attachment thereto. For example, the outside interlocking bolsters 38 can have an inner end portion that is set inside the inner bolster 30 so as to overlap with inner bolster 30. This overlapped section of the inner bolster 30 and interlocking outside bolster 38 can then be welded together for a secure connection between the outside interlocking bolsters 38 and doubled central bolsters. The overlap may be, for example, between six (6) to twenty four (32) inches.

The embodiment shown in FIGS. 8-10 has the advantage that it can be partially produced into assembled pieces that are within any potential shipping constraints. For example, as shown in FIG. 10C, the new truck body floor 24 can be assembled in three main pieces, including a central truck body floor segment 40 and two outside truck body floor segments 42. An exploded view of these components 40 and 42 is shown in FIG. 10C and assembly of such is further illustrated by FIG. 10D. To produce the central truck body floor segment 40, the frame rails 15 can be connected with central segments 45 of the bolster structures 26, including the layered inner bolster 30 and outer bolster 32. In addition, the central truck floor body segment 40 can also be outfitted with a central floor plate section 44, which may be composed of one or more steel plates. Likewise, the outside truck body floor segments 42 can be assembled by attaching each of the interlocking outside bolsters 38 to an appropriate outside floor plate section 46 for the right or left side of the new body floor 24.

The assembly of the central truck body floor segment 40 and outside truck body floor segments 42, allows for a partial assembly of the components of the new truck body floor 24 prior to shipping, followed by a final assembly of the truck body floor at a new location. For example, the central truck body floor segment 40 and outside truck body floor segments 42 can be produced in a first location. These three segments 40, 42 can then be shipped to a second location, where the outside segments 42 are attached to the central segment 40. This can be accomplished by inserting or overlapping the outside bolsters 38 within the inner bolsters 30 until the central floor plate section 44 meets outside floor plate sections 46. The floor plate sections 44, 46 and bolster components 30, 38 can then be assembled together at the second location. Alternatively, the central truck body floor segment 40 could be assembled in a first location, and then shipped along with components of the outside segments 42, which could be added to the central truck body floor segment 40 at the second location.

Any of the additional enhanced features described below and shown in FIGS. 11-16 can also be included in the construction of the new body floor 24 as shown in FIGS. 5 and 7 or the central floor body segment 40 and outside body floor segments 42 as shown in FIGS. 8 and 10.

FIGS. 11-16 show various additional enhanced features that can be included in embodiments of the new truck body floor 24. Each of the enhanced features illustrated in these drawings can be used in combination with any of the other illustrated enhanced features.

Figure 11:
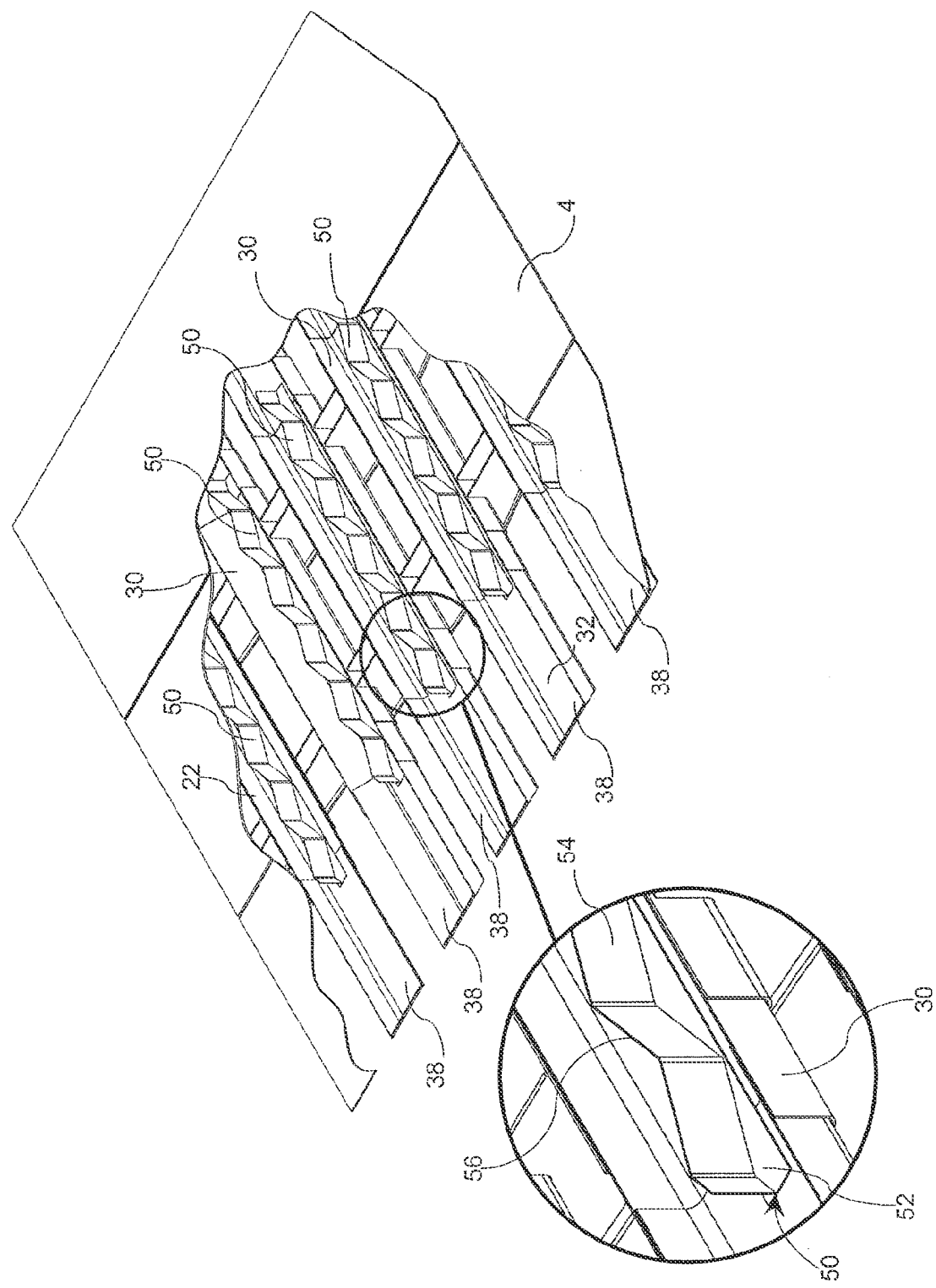
FIG. 11 is an isometric view of a new floor including floor bolster stiffeners.

FIG. 11 shows an enhanced embodiment of a new truck body floor 24 including stiffeners 50 as an additional feature that is missing from the original floor 4. The stiffeners 50 are disposed within the channel formed by the bolster structure 26. The stiffeners 50 include an elongate flat plate 52 that attaches to the web 30a of the inner bolster 30 and a scalloped stiffener plate 54 extending up from the flat plate 52. The scalloped stiffener plate 54 extends along the longitudinal length of the flat plate 52, curving back and forth from one edge of the flat plate 52 to the opposite edge. A top end 56 of the scalloped stiffener plate 54 attaches to the underside of the truck body floor plate 12. Preferably, one or more stiffeners 50 are disposed along the length of the respective bolster structure 26 so as to be centered with respect to the length of the bolster structure 26 and offset with respect to the width of the bolster structure 26. It is also possible that the stiffeners 50 be used in certain bolster structures 26 and left out of other bolster structures 26 within the same new truck body floor 24.

Figure 12A:
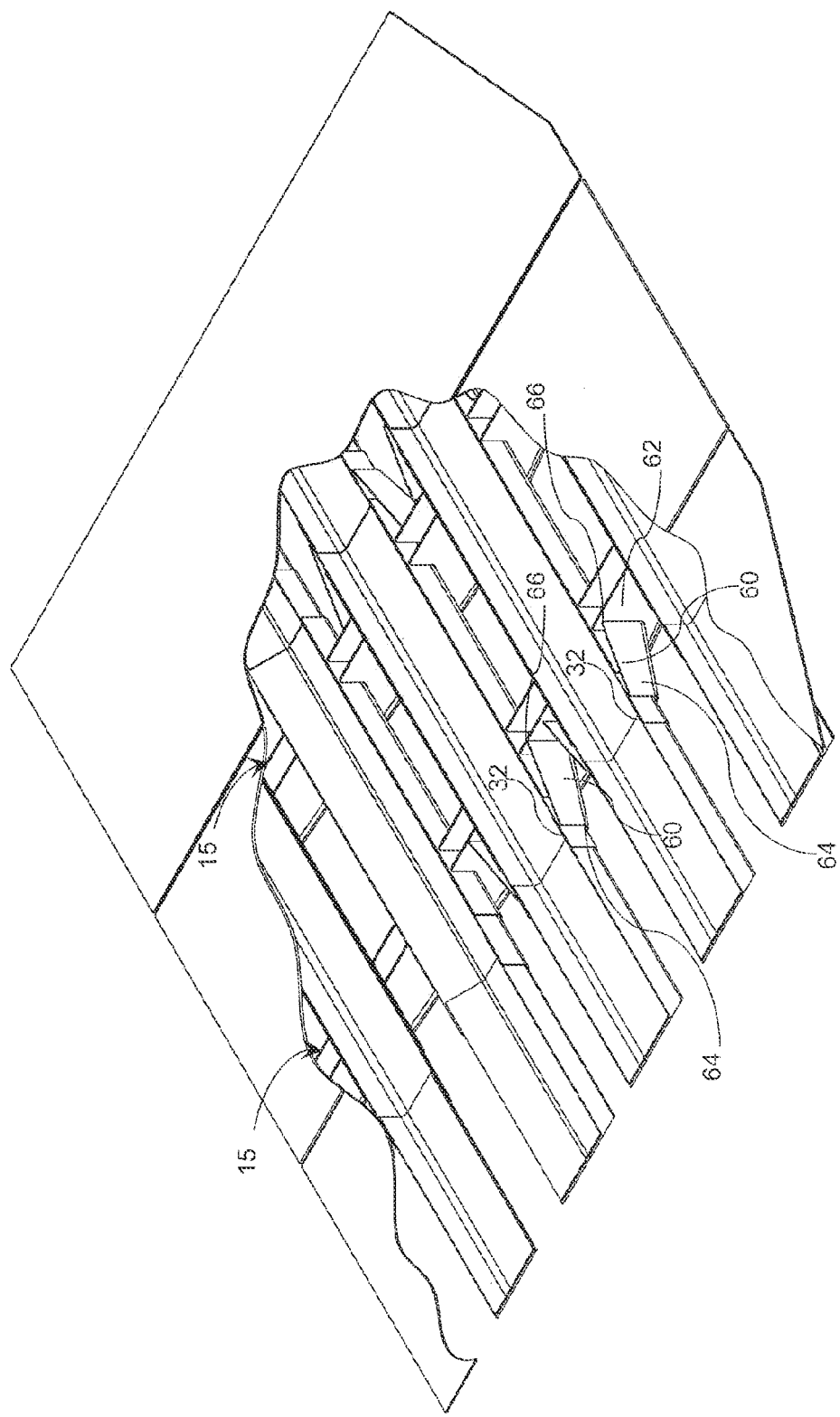
FIG. 12A is an isometric view of a new floor including lateral frame rail to bolster supports.
Figure 12B:
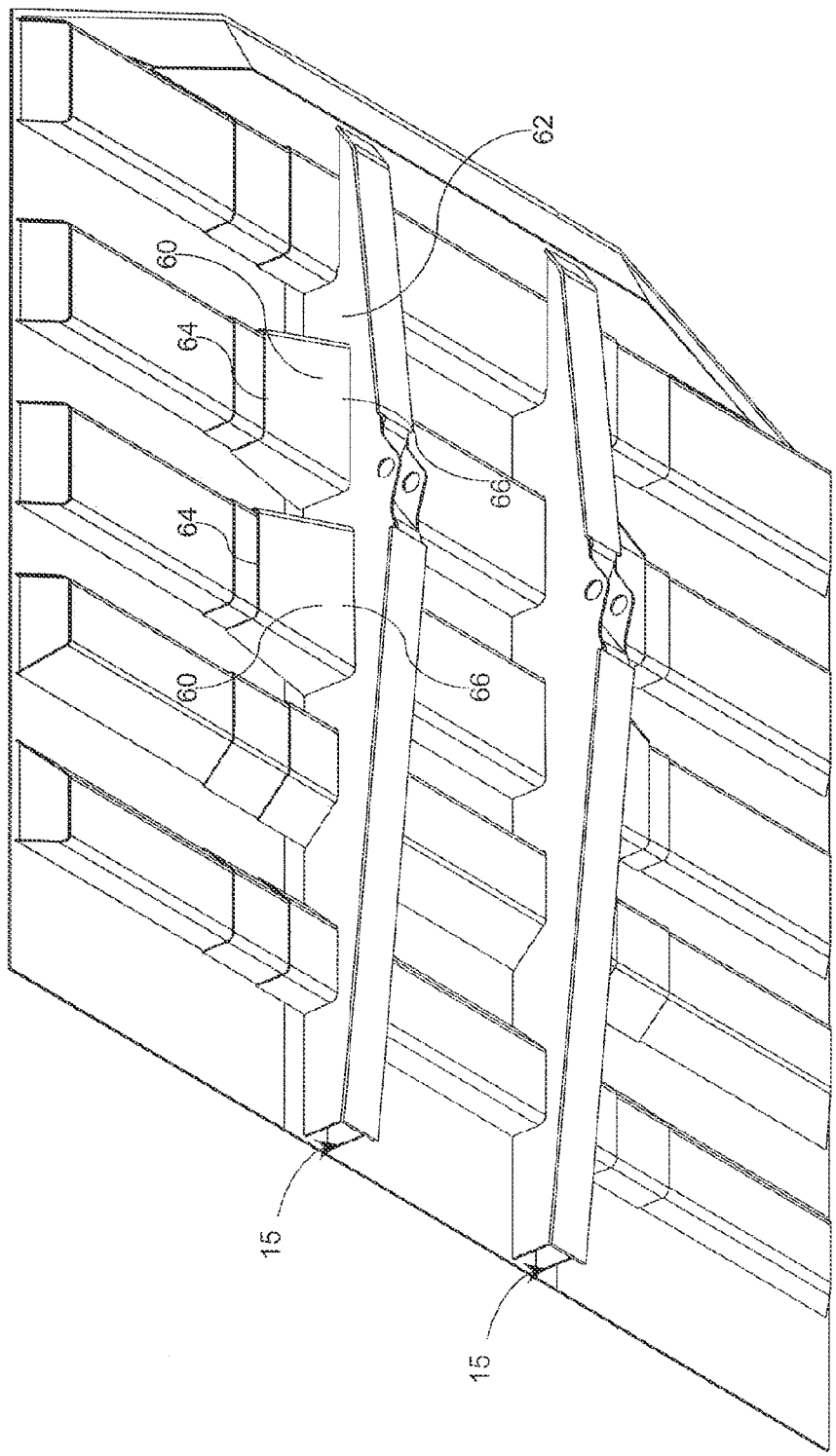
FIG. 12B is a bottom isometric view of the new floor of FIG. 12A.

FIGS. 12A and 12B show another enhanced embodiment of a new truck body floor 24 that includes an additional feature formed by half funnels 60, each extending from a side surface 62 of the frame rails 15 to the bolster structure 26. As a result, the half funnels help distribute loading between the frame rails 15 and bolster structure 26. The half funnels 60 have the shape of a tapering channel that taper outward from a narrow end 64 that fits tightly over a section of the bolster structure 26 to a wide end 66 that is disposed flush against the side surface 62 of a corresponding frame rail 15. The half funnels 60 shown in FIGS. 12A and 12B are disposed outside of the two frame rails 15. However, it is also possible to include half funnels 60 between the frame rails 15, so that such a half funnel is disposed against an inside surface of the respective frame rail 15. In the illustrated embodiment, the new body floor 24 includes a layered bolster structure, as described above, and the half funnels 60 extend from the frame rails 15 to the inner bolster 30 of the bolster structure 26. However, it is also possible for the half funnel 60 to extend to the outer bolster 32 of bolster structure 26, particularly if the outer bolster is longer than shown in FIGS. 12A and 12B.

In another enhanced embodiment, the half funnels 60 can be used in combination with both the layered bolster structure and the stiffeners 50 shown in FIG. 11.

Figure 13A:
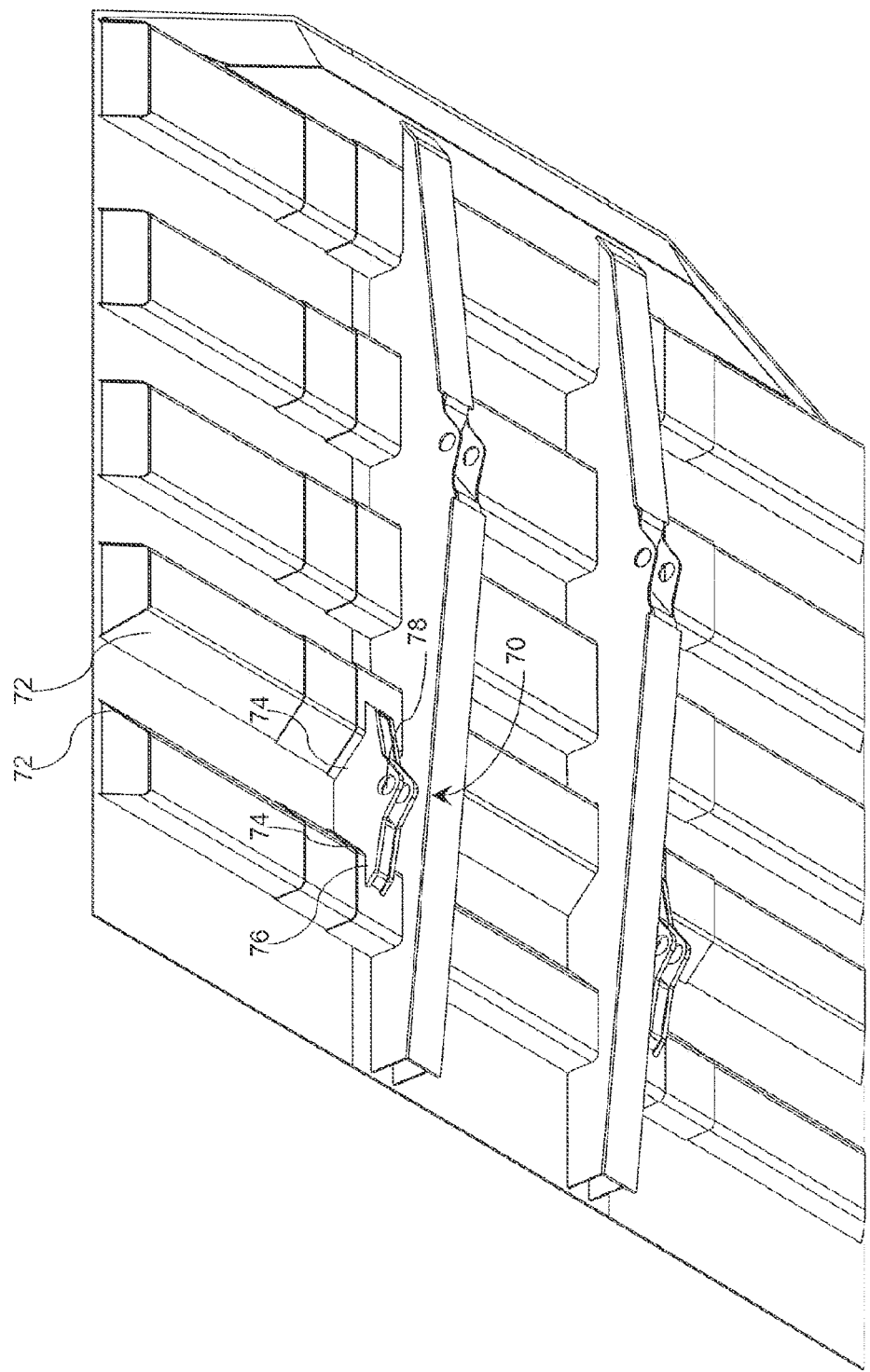
FIG. 13A is a bottom isometric view of a new floor including tapered hoist cylinder to floor bolster mounts.
Figure 13B:
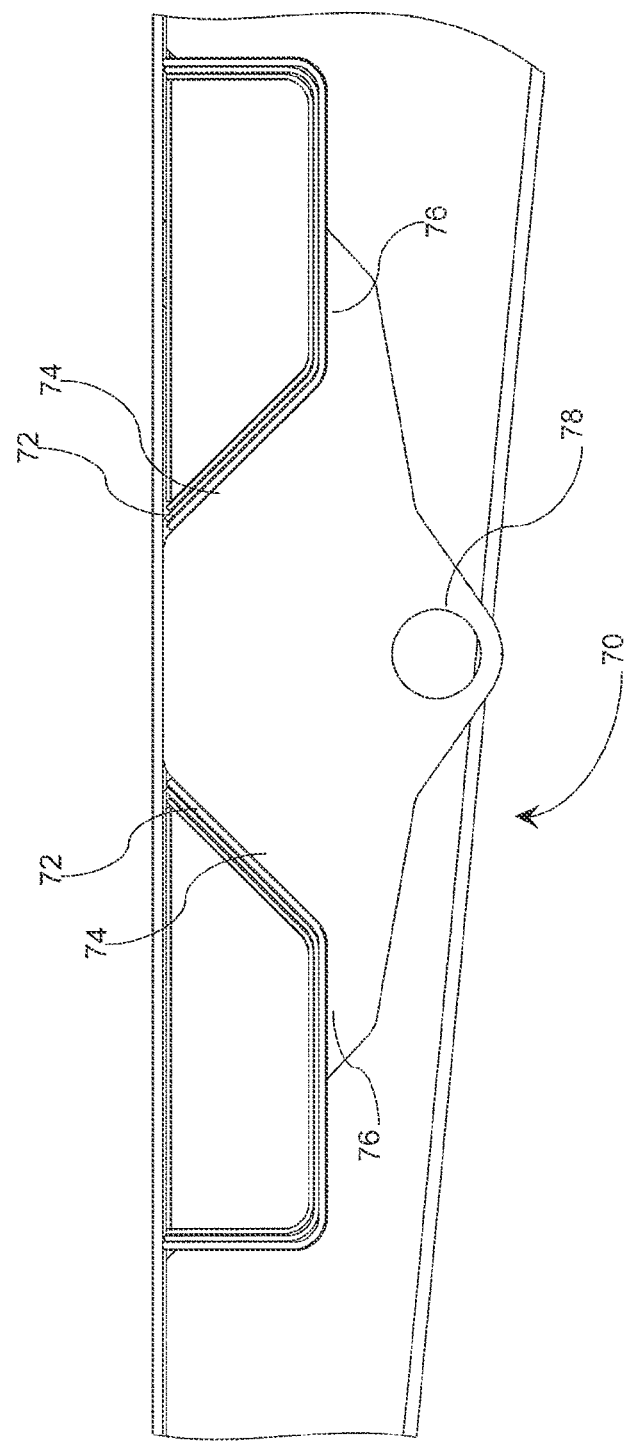
FIG. 13B is a side view of the tapered hoist cylinder to floor bolster mount used in the new floor shown in FIG. 13A.

FIGS. 13A and 13B show enhanced another embodiment of the new truck body floor 24 with an additional feature formed by tapered hoist mounts 70. To utilize the tapered hoist mounts 70, two of the bolster structures 26, on either side of the hoist mount 70, include tapered flanges 72 that taper toward one another as they extend toward the floor plate 12. Thus, the tapered flanges 72 are each disposed at an angle that is no perpendicular to the corresponding web. The tapered hoist mounts 70 include corresponding tapered supports 74 that abut the tapered flanges 72 to attach to the corresponding bolster structures 26. In addition, an extension 76 of the hoist mounts 70 may also extend outward past the flanges 72 to attach to the lower web of the bolster structure(s) 26 directly. The tapered construction of the hoist mount 70 and bolster structure(s) 26, provides added support to the hoist mounts 70 against the bolster structure(s) 26 in comparison to a connection between a hoist mount and a vertical bolster flange, since that construction requires the hoist mount to bolster connection itself to provide support to the hoist mounts. With the construction shown in FIGS. 13A and 139, the hoist mount 70 securely transfers loads from the hoist connection 78, where the hoist cylinders are mounted to the bolster structures 26 of the new truck body floor 24.

In addition to the illustrated enhanced embodiment, where the tapered hoist mounts 70 are used in combination with layered bolster structures, these hoist mounts 70 can also be used with singular bolsters. Further, the tapered hoist mounts 70 can be used in combination with the stiffeners shown in FIG. 11, with the half funnels shown in FIGS. 12A and 12B, or with both of these features.

Figure 14:
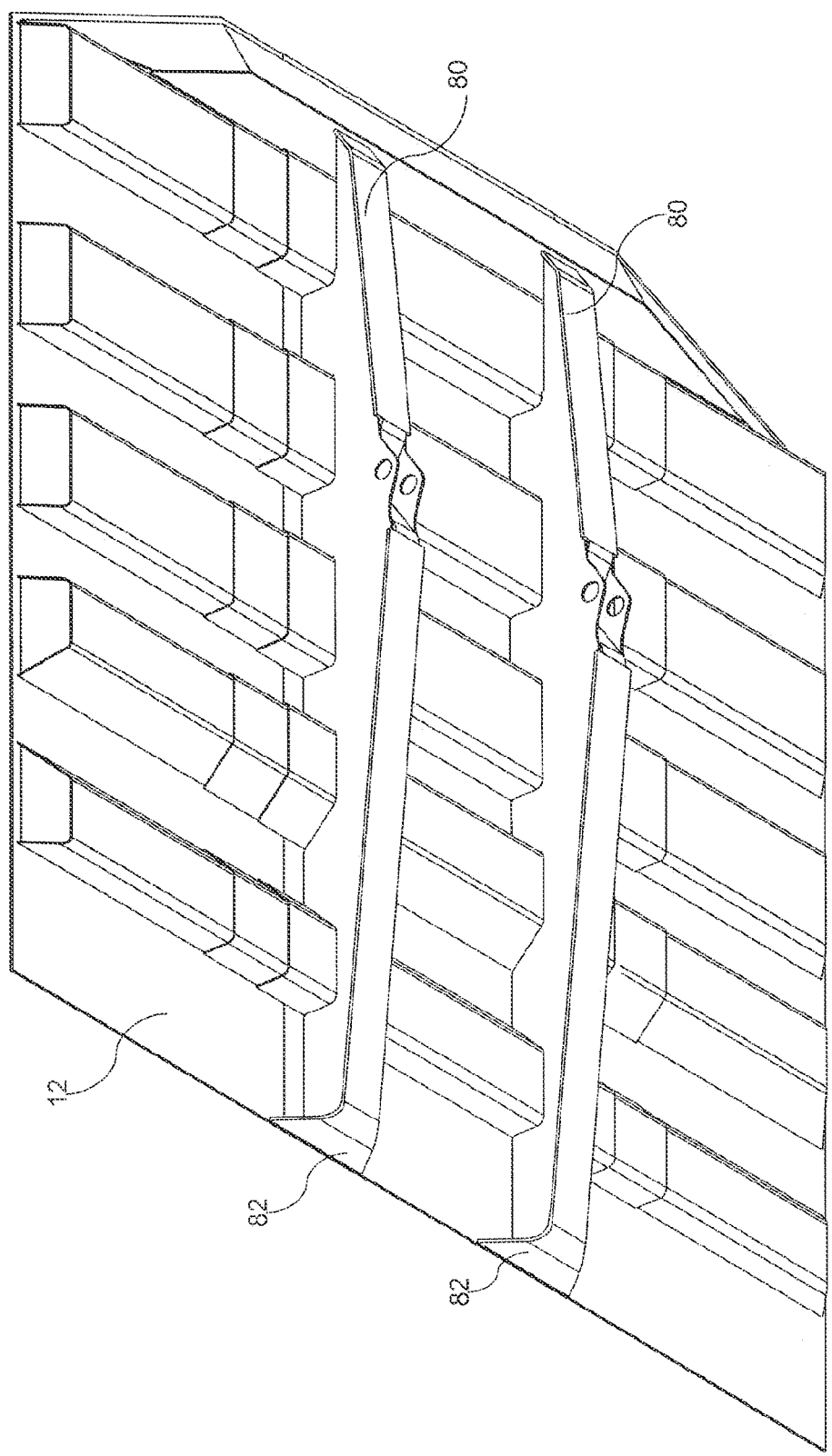
FIG. 14 is a bottom isometric view of a new floor including front tapered frame rail plates.

FIG. 14 shows another enhanced embodiment of a new truck body floor 24 including tapered frame rail plates at the front of the truck body floor, included as a new additional enhanced feature. As illustrated in FIG. 14, each of the frame rails 15 includes a frame rail plate 80 that runs along the lower portion of the frame rail 15 for substantially the entire length of the frame rail 15. At the front end of the frame rail 15, the frame rail plate 80 includes a tapered section 82 that tapers outward as the frame rail plate 80 extends upward to join the truck body floor plate 12.

In addition to the illustrated enhanced embodiment, where the tapered frame rail plates 80 are used in combination with layered bolster structures 26, these tapered frame rail plates 80 can also be used with singular bolsters. In another enhanced embodiment of the new truck body floor 24, the tapered frame rail plates 80 can be used in combination with the super stiffeners 50 shown in FIG. 11, with the half funnels 60 shown in FIGS. 12A and 12B, with the hoist mounts 70 shown in FIGS. 13A and 13B, or any combination thereof.

Figure 15:
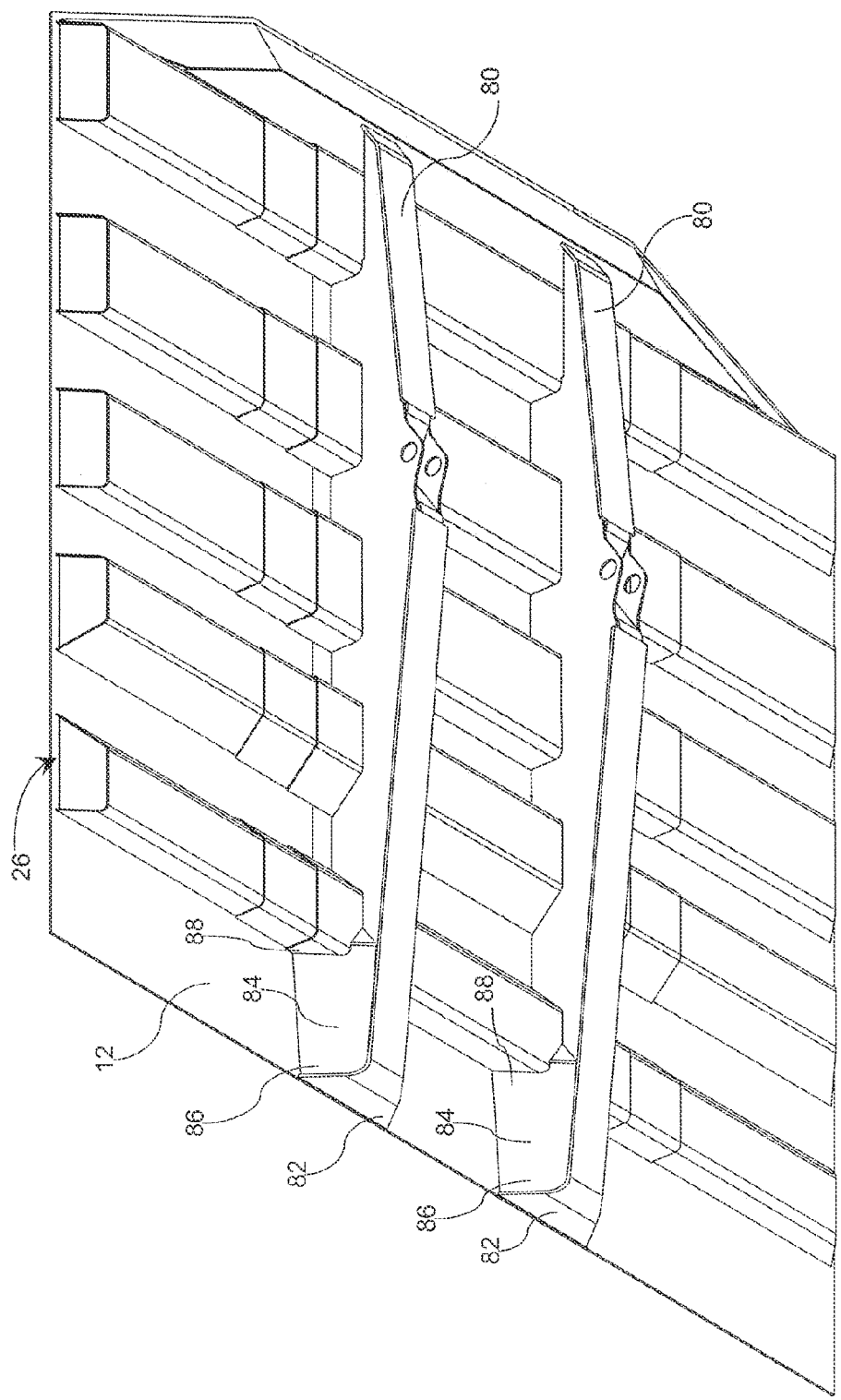
FIG. 15 is a bottom isometric view of a new floor with front tapered frame rail plates and associated frame rail support plates.

FIG. 15 shows another enhanced embodiment that includes the tapered frame rail plates shown in FIG. 14. In addition, the enhanced embodiment shown in FIG. 15 also includes frame rail support plates 84, which extend from the frame rail bottom plate 80 up to the floor plate 12 at the front of the new truck body floor 24. In a specific enhanced embodiment, the frame rail support plates 84 are disposed at a front end of the new truck body floor 24 and include a front edge 86 that extends along an edge of the tapered section 82 of the frame rail plate 80. Further, the rear edge 88 of each frame rail support plate 84 can be shaped to fit against the front-most bolster structure 26 and/or to the floor plate 12.

Figure 16A:
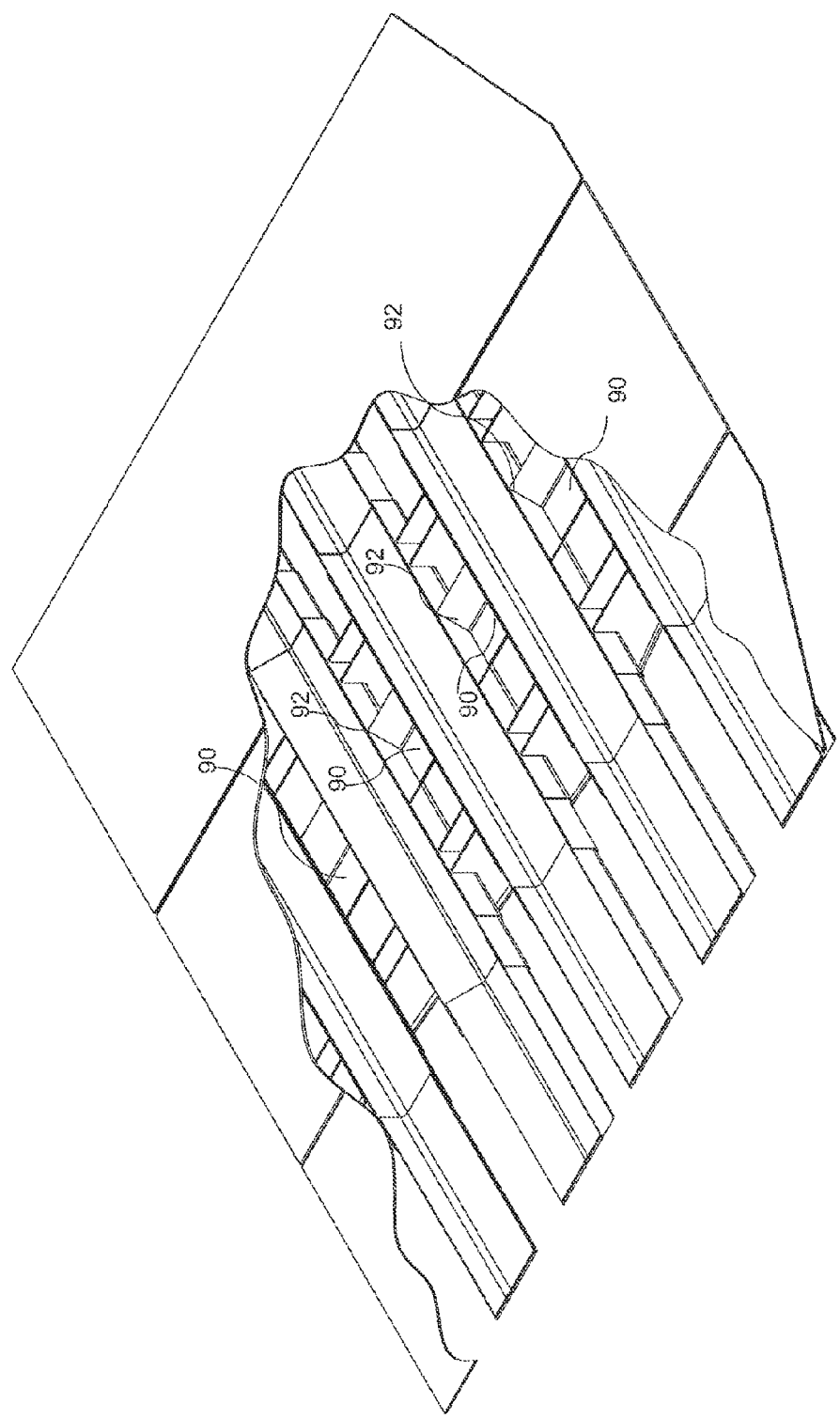
FIG. 16A is a top isometric view of a new floor including a center front to rear floor bolster.
Figure 16B:
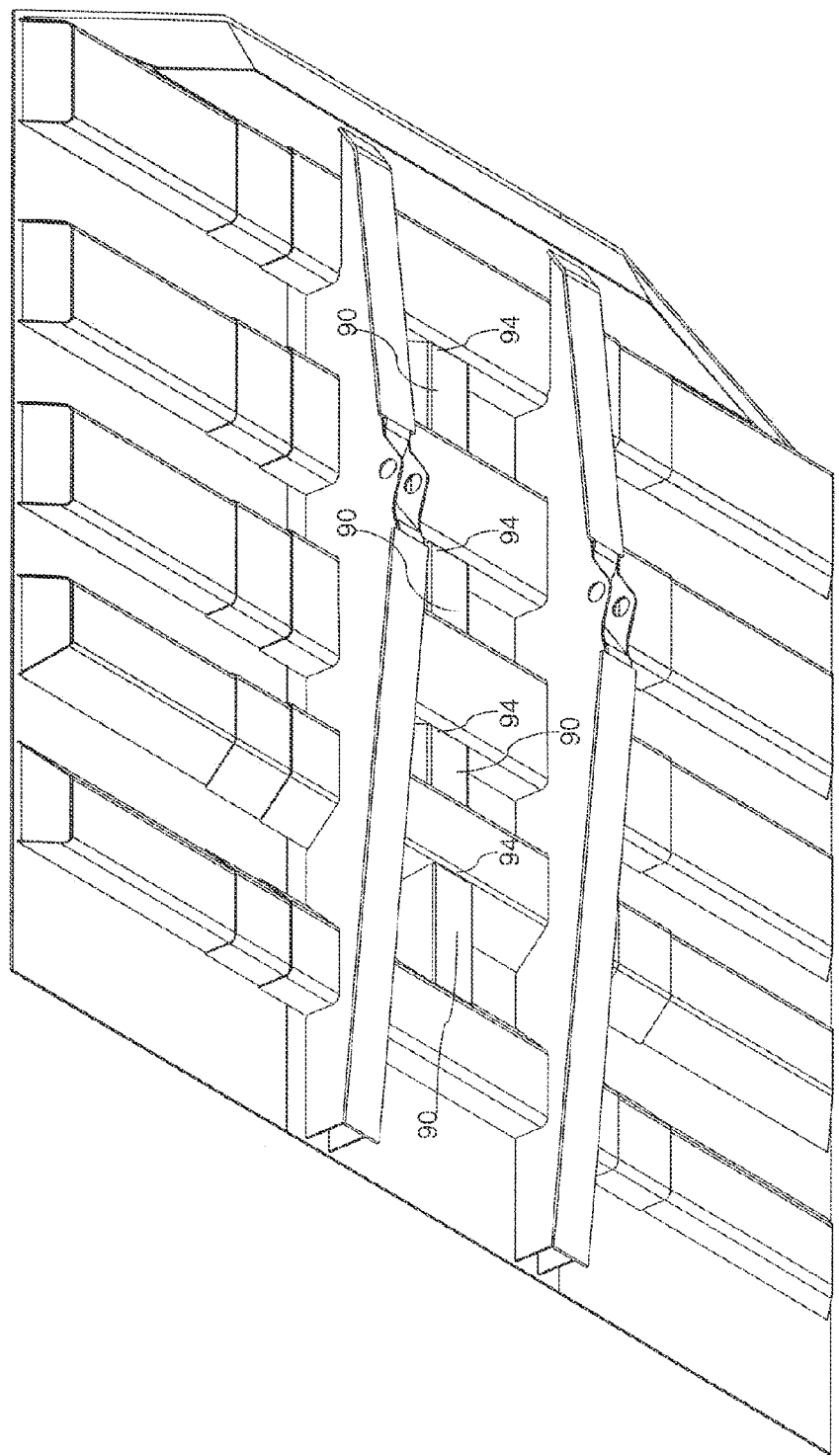
FIG. 16B is a bottom isometric view of the new floor of FIG. 16A including a center front to rear floor bolster.

FIGS. 16A and 16B shows another enhanced embodiment of a new truck body floor 24 that includes an additional feature formed by front to rear bolsters 90. The front to rear bolsters 90 are each disposed between two adjacent bolster structures 26 and include front and rear edges 92, 94 that attach to the respective neighboring bolster structure. In the illustrated enhanced embodiment, the front to rear bolsters 90 are disposed at the center of the new truck body floor 24 and are configured as a channel with outward tapering flanges. These front to rear bolsters 90 can also be disposed at the sides of the new truck body floor. It is also possible to use channels with vertical flanges or to include the front to rear bolsters 90 only between certain pairs of bolster structures 76.

In addition to the illustrated enhanced embodiment, where the front to rear bolsters 90 are used in combination with layered bolster structures 26, these front to rear bolsters 90 can also be used with singular bolsters. In another enhanced embodiment of the new truck body floor 24, the front to rear bolsters 90 can be used in combination with the stiffeners 50 shown in FIG. 11, with the half funnels 60 shown in FIGS. 12A and 12B, with the hoist mounts 70 shown in FIGS. 13A and 13B, the tapered frame rail plates 80 shown in FIG. 14, the frame rail support plates 84 shown in FIG. 15, or any combination thereof.

Figure 17:
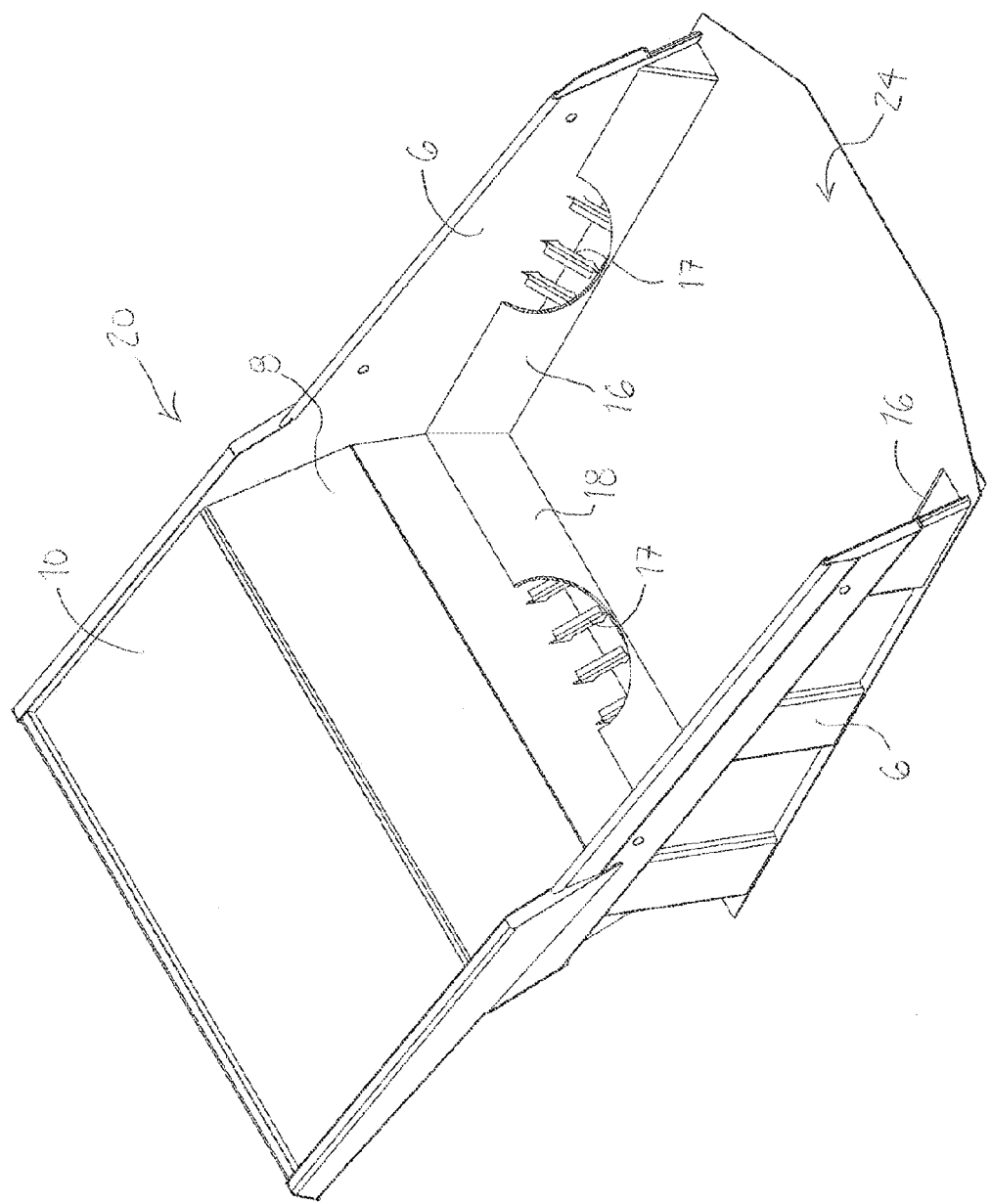
FIG. 17 is an isometric view of a body with a new floor with body floor to body sidewall and body floor to body front wall support gussets.

FIG. 17 is an isometric view of a truck body 2 with the original wall assembly 20 and with a new truck body floor 24. In addition to the new floor 24, gussets 16, 18 have been added to the rebuilt truck body. The gussets include both side gussets 16 that extend from the side walls 6 to the new floor 24 and a front gusset 18 that extends from the front wall 8 to the new floor 24. The illustrated gussets 16, 18 in FIG. 17 include structural supports 17. In addition to providing added support to the gussets from loads dumped thereon, the supports 17 also aid in providing a strong connection between the original wall assembly 20 and the new floor 24.

Figure 18:
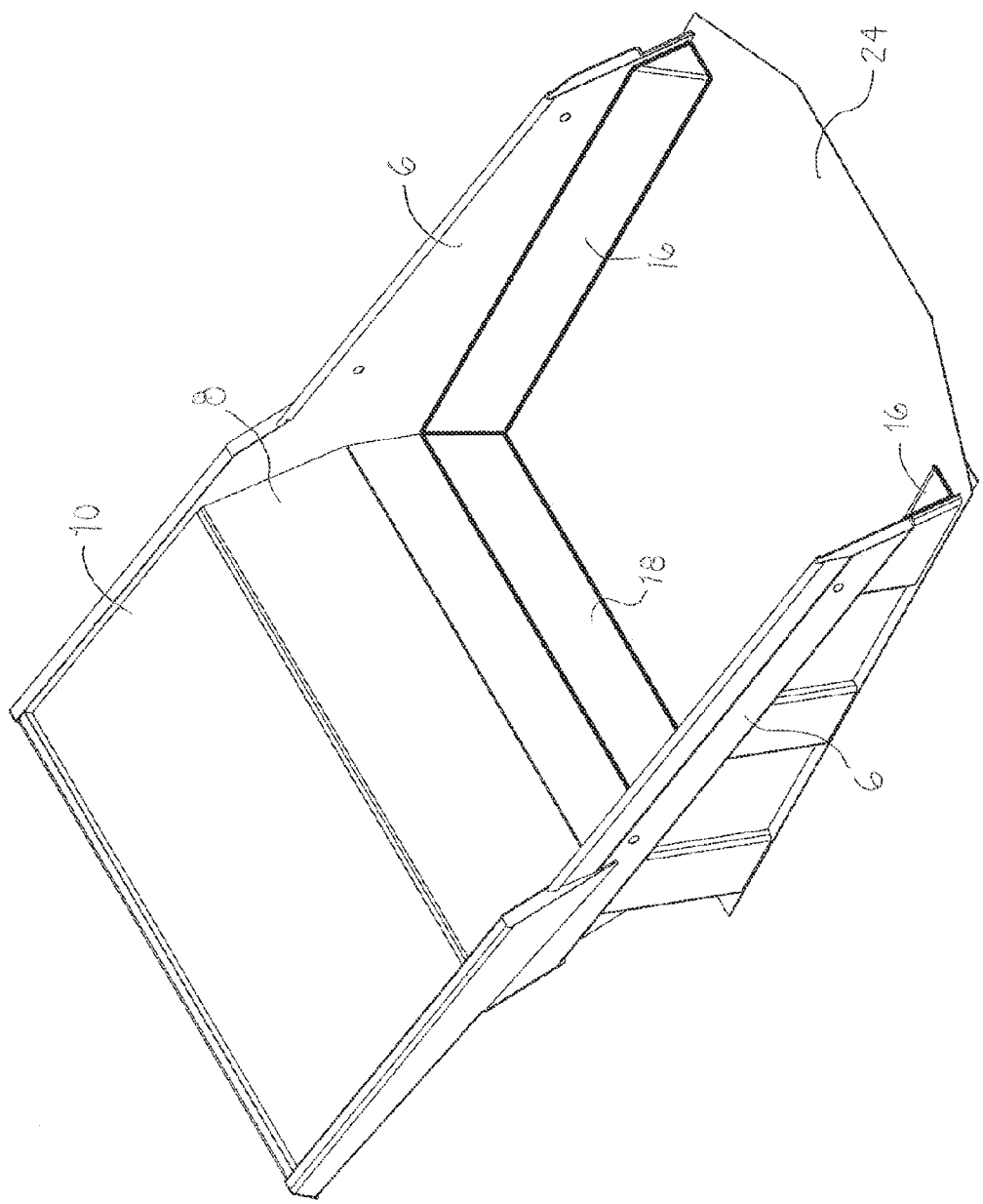
FIG. 18 is another isometric view of the body in FIG. 17 illustrating the attachment of the different gusset plates to the floor and respective walls.

FIG. 18 is an isometric view of the body in FIG. 17 now completed and ready to be put back in service with a new body floor 24 and the original wall assembly 20 including original body side walls 6, body front wall 8 and body canopy 10.

Figure 19:
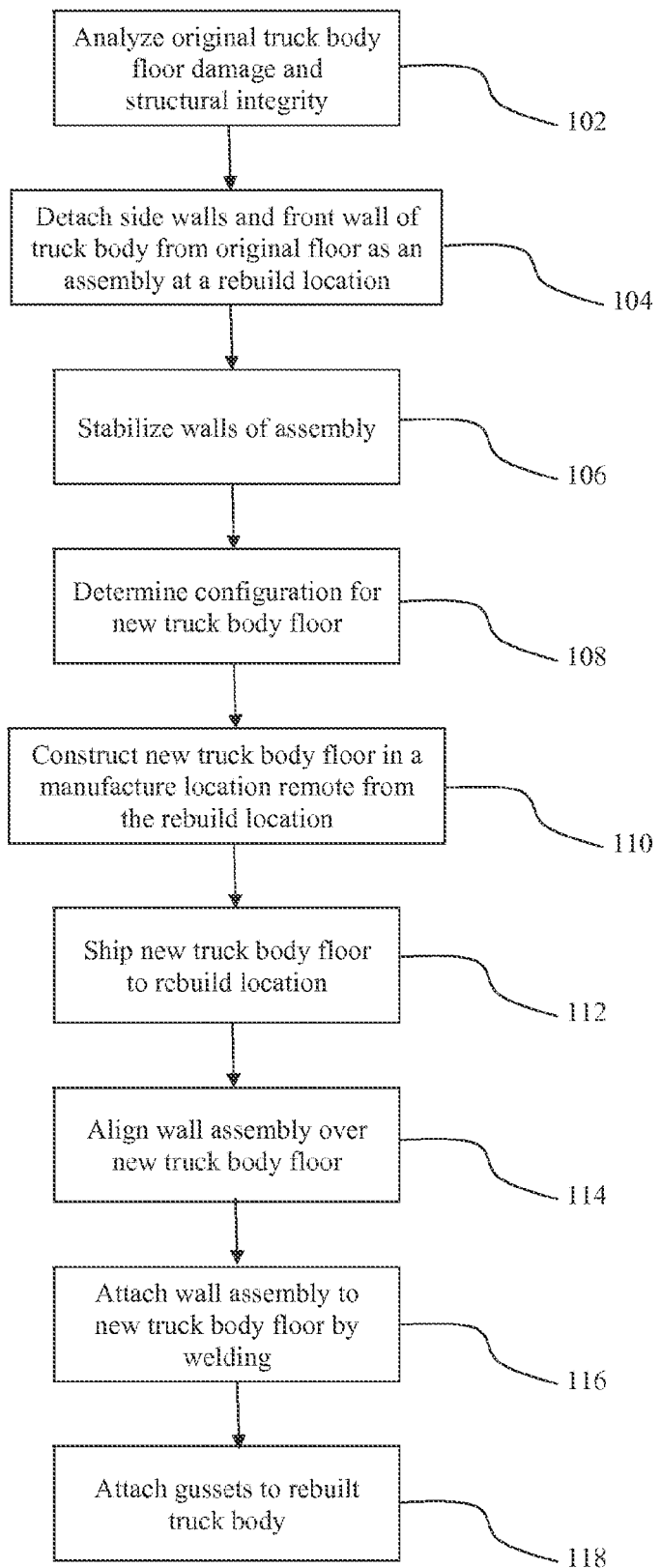
FIG. 19 shows a flow diagram of a method in accordance with an embodiment of the present invention.

A method of the present invention is shown in the flow diagram of FIG. 19. In this method, the original truck body can be assessed for damage to the floor in step 102. If it is clear that the damage is extensive, the original body floor is designated for a complete replacement with a new body floor 24. For example, a preliminary assessment may be made of the current condition of the original truck body floor 4 requiring repair, and if the preliminary estimated repair costs exceed a predetermined threshold, such as the cost to replace the entire floor, then the decision may be made to replace the entire original truck body floor 4 with a new truck body floor 24 possibly with enhanced features, as described above. In this assessment, it may not be necessary to determine if each individual component of the original truck body floor 4 must be repaired. This assessment may further include the consideration that a truck body 2 with a new truck body floor 24 will have a significantly greater operating life than an original truck body floor 4 will have with repaired components.

The wall assembly 20 is then removed from the body original floor 4 by detaching the body side walls 6 and body front wall 8 from the original body floor 4 in step 104. As an example, the walls 6, 8 can be cut away from the floor using normal fabrication methods such as a cutting torch. After the majority of the original body floor 1 is separated from the wall assembly 20, the wall assembly 20, formed by side walls 6, front wall 8 and canopy 10, is lifted off the original floor 4 using some type of a hoist, such as a crane. If necessary or desirable, lifting eyes may be added to the wall assembly 20 to provide an adequate fastener for attaching the crane. Once the wall assembly is separated from the original floor 4, any additional fragments of the floor components that may remain attached to the walls 6, 8 can be removed to prepare the wall assembly 20 for attachment to the new truck body floor 24.

The individual sidewalls of the wall assembly 20 are stabilized during the substitution of the original truck body floor 4 with the new truck body floor 24 in step 106. The stabilization may be carried out before the wall assembly 20 is actually removed, so that the wall assembly 20 is stable during the removal of the original floor, or it could be carried out after the floor is already removed. Specifically, a stabilizer member 22 can be attached at the rear end of the truck body, between the two side walls 6. A new replacement floor 24 is provided for attachment to the wall assembly 20 in steps 108-112. The configuration of the new floor 24 is determined in step 108. The new body floor 24 can be configured with one or more of the additional enhanced features described above to tailor the floor to the particular use and environment associated with the truck body, if it is determined that the original truck body was not appropriately configured. The truck body floor 24 is then constructed in step 110. In an advantageous embodiment, the new floor 24 can be constructed in a location that is remote from the truck body operating location. For example, if the truck body 2 is being utilized at a mining site, it is not uncommon to have a truck repair and/or rebuild facility within the vicinity of the mining site. However, in accordance with an embodiment of the present invention, the new floor 24 can be constructed at a separate location, such as a manufacturing facility that is remote from the mining site. For example, the manufacturing facility could be more than 10 miles, or more than 100 miles away. In this case, the new floor 24 could be constructed, based on the selected configuration as described above, at the first location and then shipped to the second location, as shown in step 112.

Figure 10C:
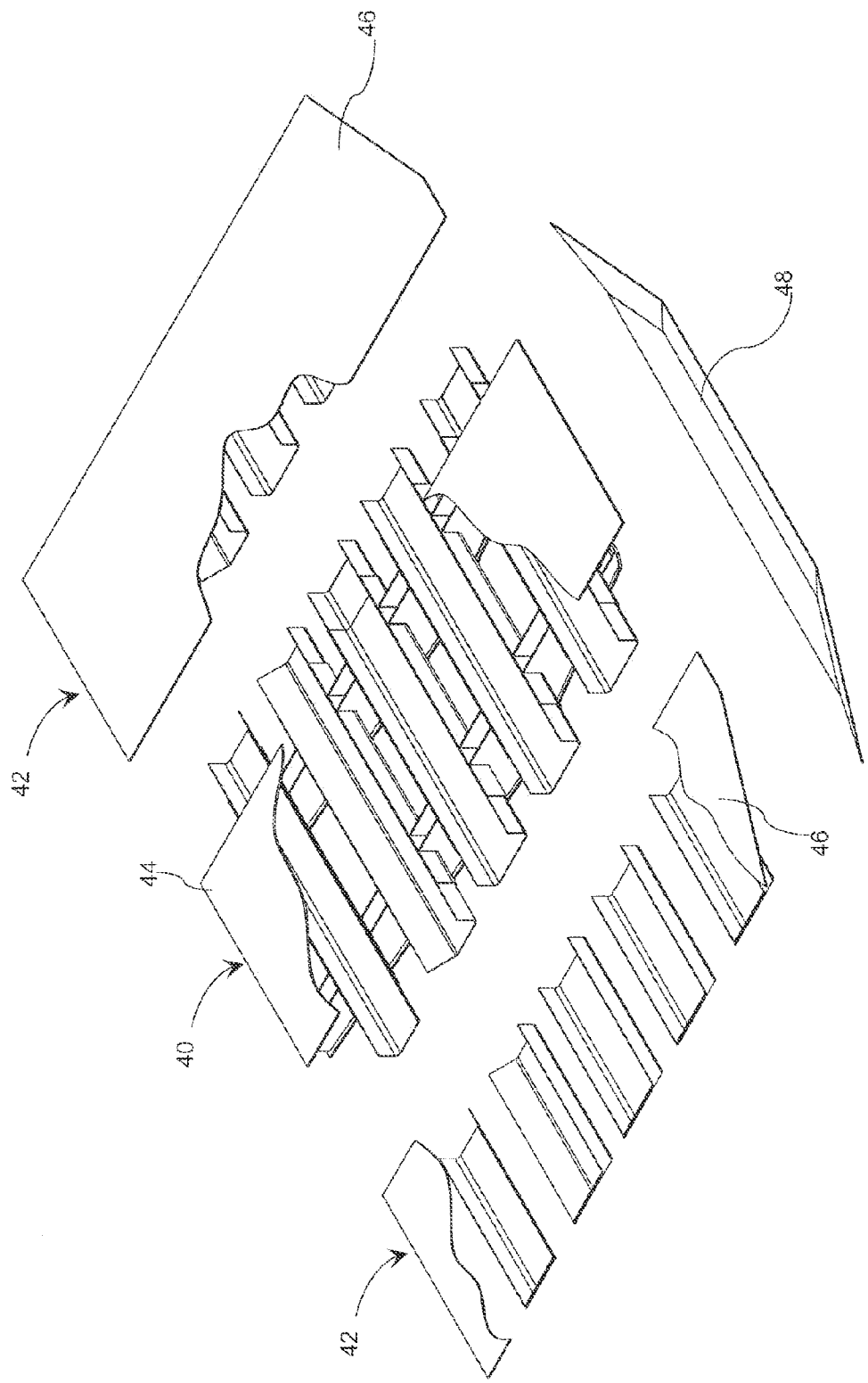
FIG. 10C is an isometric view showing the separate pieces of the new floor of FIG. 8 for modular shipping.
Figure 10D:
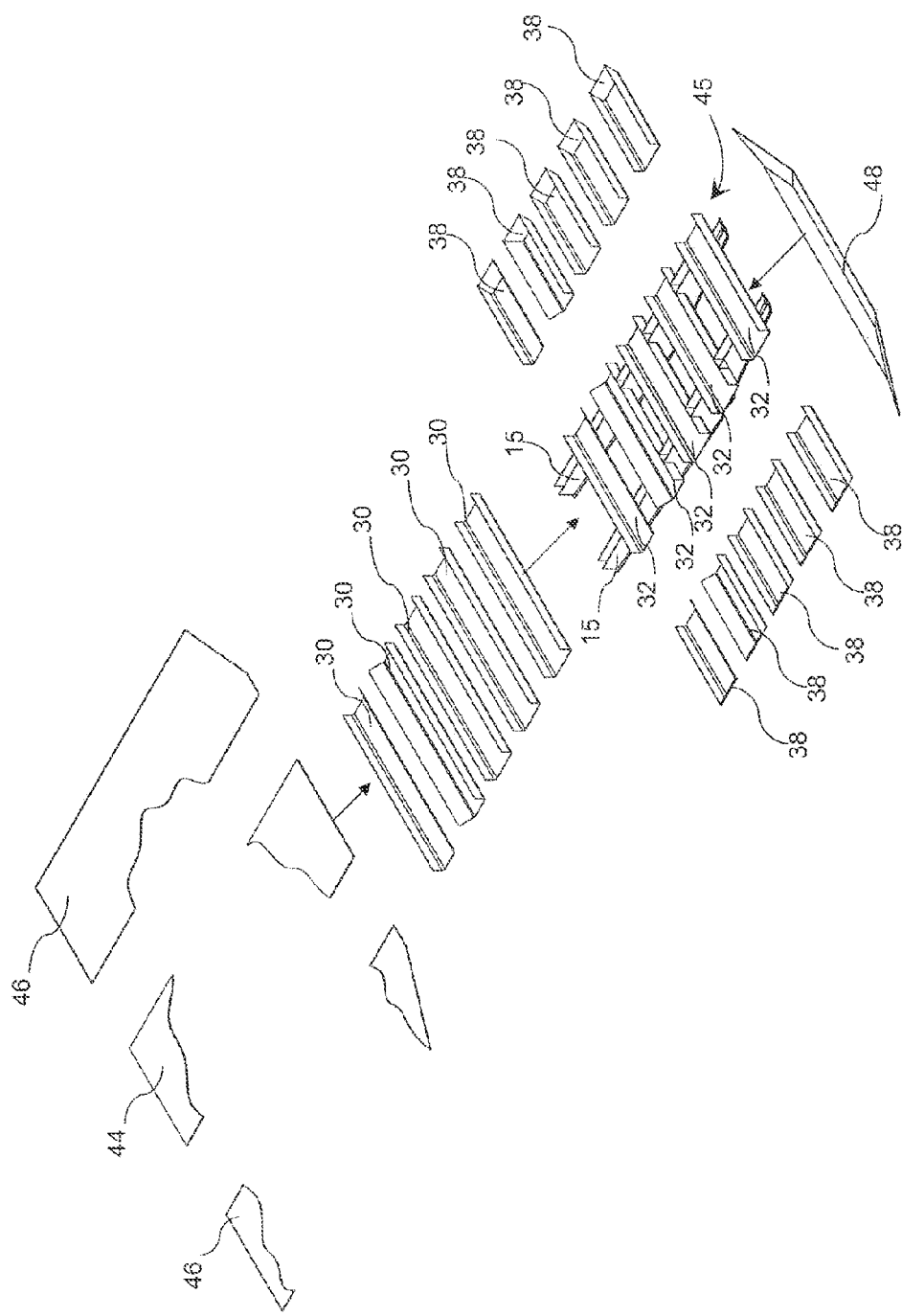
FIG. 10D is an exploded isometric view of the new floor of FIG. 8.

If the truck body 2 is appropriately sized to facilitate shipping of the new floor 24 in one piece, the new floor 24 may be assembled at the manufacturing site and shipped in the assembled form. The wall assembly 20 can then be quickly and easily coupled to the new body floor 24 at the repair/rebuild facility near or at the mining site. On the other hand, if the size of the truck body 2 is large enough to prohibit easy transport of the truck body floor 24 as a single piece, the floor 24 can be constructed at the manufacturing facility in several pieces, such as shown in FIG. 10C. These pieces can then be shipped to the repair/rebuild facility near the mining site and assembled at the site before coupling the body new floor 24 to the wall assembly 26. In this particular embodiment, it is preferable for the pieces to be relatively small in number, such that the "assembly" carried out at the repair/rebuild facility is not a complete fabrication of a new floor 24 using all the individual components. Thus, the pieces may include already assembled center and outer pieces that only need to be attached to one another at the repair/rebuild facility. In a particular embodiment, the new body floor 24 is shipped in pieces including main sub-assemblies, for example, including a central floor segment 40 without the corresponding floor plate section, the central floor plate section, two outside floor segments 42, and a rear edge of the floor plate.

While the steps of determining the configuration of the new truck body floor, constructing the new floor and shipping the new floor are described above as being carried out after the wall assembly is removed from the original floor, it is also possible for the wall assembly to be removed after the new floor has been designed, constructed and shipped to the rebuild location.

The new truck body floor that is shipped to the rebuild location is then held while the original wall assembly is disposed over the new truck body floor and aligned with the new floor, in step 114. The individual walls 6, 8 of the wall assembly 20 are then attached to the new truck body floor 24, by one of various methods, such as welding, in step 116. With the wall assembly 20 secured to the new floor 24, gussets are fastened to the rebuilt truck body in step 118. The rebuilt truck body is thus completed, as shown in FIG. 18.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of rebuilding an off-highway truck body having at least a 100 ton payload hauling capacity, the method comprising:
   disconnecting a front wall and side walls of a truck body from an original floor of the truck body so as to remove a connected wall assembly including the front wall and side walls from the original floor;
   assembling an entirely new floor that is separate from the original floor;
   coupling the front wall and side walls of the wall assembly to the entirely new floor so as to form a rebuilt off-highway truck body that includes the entirely new floor.

2. The method recited in claim 1, further comprising connecting a stabilizer member to each of the side walls so as to brace the wall assembly while the wall assembly is detached from both the original floor and new floor.

3. The method recited in claim 1, further comprising:
   removing a gusset that extends from the original floor to one of the walls by detaching the gusset from each of the original floor and the respective wall before disconnecting the front wall and side walls from the original floor.

4. The method recited in claim 1, further comprising:
   attaching a gusset to the rebuilt off-highway truck body that extends between the new floor and at least one of the front wall or side walls.

5. The method recited in claim 1, further comprising adding at least one additional structural feature to the new floor that is absent from the original floor so that a configuration of the new floor differs from a configuration of the original floor.

6. The method recited in claim herein the at least one additional feature includes at least one of:
   a layered bolster structure attached to two frame rails of a frame of the new truck body floor, the frame rails extending along a longitudinal length of the truck body floor, and the layered bolster structure extending across a width of the new truck body floor and including an inner bolster and an outer bolster that is at east partially flush with and attached to the inner bolster,
   a stiffener disposed in a channel formed in a bolster that extends across a width of the new truck body floor, or
   a half funnel extending from a side surface of a frame rail of the new truck body floor to a surface of a respective bolster structure of the new truck body floor so as to distribute loading between the frame rail and the respective bolster structure, the half funnel including a tapered channel with an narrow end that fits tightly on a surface of the respective bolster structure and wide end configured to abut the side surface of the frame rail.

* * * * *

UNITED STATES PATENT AND TRADEMARK OFFICE
CERTIFICATE OF CORRECTION

PATENT NO.         : 8,635,754 B2                                                Page 1 of 1
APPLICATION NO.    : 13/853382
DATED              : January 28, 2014
INVENTOR(S)        : Hagenbuch It is certified that error appears in the above-identified patent and that said Letters Patent is hereby corrected as shown below:

In the Claims

Claim 6, Column 16, line 39, "The method recited in claim herein the at least one additional feature includes at least one of:" should read --The method recited in claim 5, wherein the at least one additional feature includes at least one of:--

Signed and Sealed this
Twenty-second Day of July, 2014

Michelle K. Lee
*Deputy Director of the United States Patent and Trademark Office*